US00RE44815E

(19) United States
(12) Reissued Patent
Pierson

(10) Patent Number: US RE44,815 E
(45) Date of Reissued Patent: Mar. 25, 2014

(54) SYSTEM AND METHOD FOR CHILLING INLET AIR FOR GAS TURBINES

(71) Applicant: TAS Energy Inc., Houston, TX (US)

(72) Inventor: Thomas L. Pierson, Sugar Land, TX (US)

(73) Assignee: TAS Energy, Inc., Houston, TX (US)

(21) Appl. No.: 13/777,820

(22) Filed: Feb. 26, 2013

Related U.S. Patent Documents

Reissue of:
(64) Patent No.: 7,343,746
Issued: Mar. 18, 2008
Appl. No.: 10/894,453
Filed: Jul. 19, 2004

U.S. Applications:
(63) Continuation of application No. 12/661,265, filed on Mar. 12, 2010, now Pat. No. Re. 44,079, which is an application for the reissue of Pat. No. 7,343,746, which is a continuation of application No. 10/206,856, filed on Jul. 26, 2002, now Pat. No. 6,769,258, which is a continuation-in-part of application No. 09/961,711, filed on Sep. 24, 2001, now Pat. No. 6,470,686, which is a continuation of application No. 09/369,788, filed on Aug. 6, 1999, now Pat. No. 6,318,065.

(51) Int. Cl.
*F02C 1/00* (2006.01)
*F02G 3/00* (2006.01)
*F01K 23/10* (2006.01)
*F02C 7/143* (2006.01)

(52) U.S. Cl.
CPC ..... *F01K 23/10* (2013.01); *F02C 7/143* (2013.01)
USPC ..... 60/772; 60/775; 60/39.53; 60/728; 60/39.182; 62/175

(58) Field of Classification Search
CPC ..... F01K 23/10; F02C 7/143; F24F 5/0017; Y02E 20/16; Y02E 60/147
USPC ..... 60/728, 773, 775, 39.3, 39.53, 266, 60/267, 39.182; 62/175, 332
See application file for complete search history.

(56) References Cited

U.S. PATENT DOCUMENTS

| | | | | |
|---|---|---|---|---|
| 1,781,541 | A | 11/1930 | Einstein | |
| 2,336,066 | A | 12/1943 | Cain | |
| 2,689,467 | A | 9/1954 | Verber | |
| 3,148,513 | A | 9/1964 | Ewing | |
| 4,244,191 | A | 1/1981 | Hendricks | |
| 4,244,517 | A | 1/1981 | Stanke et al. | |
| 4,418,527 | A | 12/1983 | Schlom et al. | |
| 4,446,703 | A | 5/1984 | Gilbertson | |
| 4,463,574 | A * | 8/1984 | Spethmann et al. | 62/175 |
| 4,483,152 | A * | 11/1984 | Bitondo | 62/175 |
| 4,792,091 | A | 12/1988 | Martinez, Jr. | |
| 4,926,649 | A | 5/1990 | Martinez, Jr. | |
| 4,951,460 | A | 8/1990 | Prochaska et al. | |
| 5,012,646 | A | 5/1991 | Speer | |
| 5,065,598 | A | 11/1991 | Kurisu et al. | |
| 5,083,423 | A | 1/1992 | Prochaska et al. | |
| 5,111,875 | A | 5/1992 | Hammarstedt | |
| 5,191,767 | A | 3/1993 | Kane et al. | |
| 5,203,161 | A | 4/1993 | Lehto | |
| 5,321,944 | A * | 6/1994 | Bronicki et al. | 60/775 |
| 5,386,685 | A | 2/1995 | Frutschi | |
| 5,444,971 | A * | 8/1995 | Holenberger | 60/783 |
| 5,457,951 | A * | 10/1995 | Johnson et al. | 60/780 |
| 5,465,585 | A | 11/1995 | Mornhed et al. | |
| 5,622,044 | A | 4/1997 | Bronicki et al. | |
| 5,632,148 | A * | 5/1997 | Bronicki et al. | 60/728 |
| 5,655,373 | A | 8/1997 | Yamashita et al. | |
| 5,758,502 | A * | 6/1998 | Utamura et al. | 60/728 |
| 5,782,080 | A | 7/1998 | Illbruck | |
| 5,782,093 | A | 7/1998 | Yamashita et al. | |
| 5,790,972 | A * | 8/1998 | Kohlenberger | 701/103 |
| 5,894,739 | A | 4/1999 | Temos | |
| 6,173,563 | B1 | 1/2001 | Vakil et al. | |
| 6,185,946 | B1 | 2/2001 | Hartman | |
| 6,209,330 | B1 | 4/2001 | Timmerman et al. | |
| 6,301,897 | B1 * | 10/2001 | Uchida | 60/728 |
| 6,318,065 | B1 | 11/2001 | Pierson | |
| 6,324,867 | B1 * | 12/2001 | Fanning et al. | 62/613 |
| 6,405,549 | B1 | 6/2002 | Baffes | |
| 6,408,609 | B1 * | 6/2002 | Andrepont | 60/772 |
| 6,422,018 | B1 | 7/2002 | Tisdale et al. | |
| 6,470,686 | B2 | 10/2002 | Pierson | |
| 6,769,258 | B2 | 8/2004 | Pierson | |
| 6,848,267 | B2 * | 2/2005 | Pierson | 62/299 |

| | | | | |
|---|---|---|---|---|
| 7,343,746 | B2 | 3/2008 | Pierson | |
| 7,644,573 | B2 * | 1/2010 | Smith et al. | 60/39.182 |
| 7,716,930 | B2 * | 5/2010 | Chillar et al. | 60/728 |
| 8,356,466 | B2 * | 1/2013 | Motakef et al. | 60/39.182 |
| 2008/0276617 | A1 * | 11/2008 | Mak | 60/728 |
| 2011/0088399 | A1 * | 4/2011 | Briesch et al. | 60/728 |

OTHER PUBLICATIONS

Dorgan, Charles E., et al., Design Guide for Cool Thermal Storage; Chilled Water Storage; pp. 4-1 to 4-7; 4-10 to 4-18; 4-24 to 4-26; 1993 by the American Society of Heating, Refrigerating and Air-Conditioning Engineers, Inc.; Atlanta, Georgia; ISBN 1-883413-07-9.
Holman, J. P., Thermodynamics, Second Edition; McGraw-Hill Book Company, New York, 1974, pp. 450-455.
Ondryas, Igor S., et al.; Options in Gas Turbine Power Augmentation Using Inlet Air Chilling, presented at the Gas Turbine and Aeroengine Congress and Exposition, Jun. 11-14, 1990, Brussels, Belgium.
1994 ASHRAE Handbook; Refrigeration, I-P Edition; American Society of Heating, Refrigerating and Air-Conditioning Engineers, Inc., Atlanta, GA, 17 pgs.
1995 ASHRAE Handbook; Heating, Ventilating, and Air-Conditioning Applications, American Society of Heating, Refrigerating and Air-Conditioning Engineers, Inc., Atlanta, GA, Inch-Pound Edition, 23 pgs.
1996 ASHRAE Handbook No. 1; Heating, Ventilating, and Air-Conditioning Systems and Equipment; American Society of Heating, Refrigerating and Air-Conditioning Engineers, Inc., Inch-Pound Edition, Atlanta, GA, 17pgs.
1996 ASHRAE Handbook No. 2; Heating, Ventilating, and Air-Conditioning Systems and Equipment; American Society of Heating, Refrigerating and Air-Conditioning Engineers, Inc., Inch-Pound Edition, Atlanta GA, 48 pgs.
1996 ASHRAE Handbook No. 3; HVAC Systems and Equipment, I-P Edition, 15 pgs.
Clark, Kenneth M, P.E, et al., The Application of Thermal Energy Storage for District Cooling and Combustion Turbine Inlet Air Cooling, Proceedings of the International District Energy Association 89th Annual Conference, San Antonio, TX, Jun. 1998, p. 85.
Coad, William J., P.E., A Fundamental Perspective on Chilled Water Systems, McClure Engineering Associates, St. Louis MO, 12 pgs.
Ferreira, Joao de Jesus, Cold Production From Heat, Energie-Cites/Ademe, Climaespaco S.A., 1998, 4 pgs.
Dharmadhikari, Shashi, Ph.D. et al., Contribution of Stratified Thermal Storage of Cost-Effective Trigeneration Project, ASHRAE Transactions: Symposia, 106 ASHRAE Trans., pt. 2, MN-00-16-2 (2000) 8 pgs.
Gidwani, B. N., et al, Optimization of Chilled Water Systems, ESL-1E-87-09-27; Proceedings from the Ninth Annual Industrial Energy Technology Conference, Houston, TX, Sep. 16-18, 1987, 6 pgs.
Hartman, Thomas B., P.E., Design Issues of Variable Chilled-Water Flow Through Chillers; The Hartman Company, Marysville, WA, SA-96-12-2, 5 pgs.
Industrial Refrigeration Rotary Screw Process Chillers, Dunham-Bush, Form No. 6061-1A, 44 pgs.
Jolly, Sanjeev, P.E., et al., Capacity Enhancement of ABB 11N1 with Thermal Energy Storage, Power Gen International, New Orleans, LA, Nov. 30-Dec. 2, 1999, 8 pgs.
Mornhed, G., et al., Innovations in District Heating and Cooling 1984-1994 and Their Economic Impact; ASHRAE Transactions; Symposia, CH-95-10-4, 6 pgs.
Ondryas, I.S., et al., Options in Gas Turbine Power Augmentation Using Inlet Air Chilling, Journal of Engineering for Gas Turbines and Power, Apr. 1991, vol. 113 / 203, 9 pgs.
Polimeros, George, Energy Cogeneration Handbook, Industrial Press Inc., New York, NY, 1981, 17 pgs.
Punwani, Dharam V., et al., A Hydrid System for Combustion Turbine Inlet Air Cooling at the Calpine Clear Lake Cogeneration Plant in Pasadena, TX, Jul. 13, 2000 Draft for ASHRAE Review, ASHRAE Winter Meeting Atlanta, GA, Jan. 2001, 17 pgs.
Purpose of System, Section 1, jb1393.kmc, 48 pgs.
Reddy, Agami, Ph.D., P.E., et al., Determining Long-Term Performance of Cool Storage Systems From Short-Term Tests, ASHRAE Research Project 1004; Literature Review, Preliminary Methodology Description and Final Site Selection, Nov. 1997, Revised Feb. 1998, 200 pgs.
Reeves, et al., Commercial Cool Storage Design Guide, GPU Service Corporation Parsippany, NJ, EPRI EM-3981 Project 2036-3, Final Report May 1985, 258 pgs.
Stewart, William E., Jr., ASHRAE Research Project Report RP-993; Improved Fluids for Naturally Stratified Chilled Water Storage Systems, Aproval; Jul. 1998; 2012 ASHRAE www.ashrae.org , Jul. 1998, 30 pgs.
Stewart, William E., Jr., Design Guide: Combustion Turbine Inlet Air Cooling Systems, American Society of Heating, Refrigerating and Air-Conditioning Engineers, Inc., 1999,35 pgs.
Traine Applications Engineering Manual, Multiple-Chiller-System Design and Control, Trane, SYS-APM001-EN (Mar. 2001), Mar. 2001, 100 pgs.
Vogelsang, Marlene, CoolTools Chilled Water Plant Design and specification Guide, Pacific Gas and Electric Company, Report #CT-016-May 2000, 302 pgs.
Water-Cooled Reciprocating Packaged Water Chillers, WHR 017EW through WHR 210EW, 60 Hertz, Refrigerant R-22, Product Manual, 1997 McQuay International, 62 pgs.
1991 ASHRAE Handbook; Heating, Ventilating, and Air-Conditioning Applications, Inch-Pound Edition; American Society of Heating, Refrigerating and Air-Conditioning Engineers, Inc., 1791 Tullie Circle, N.E. Atlanta, GA 30329, pp. 1-39.12.
Chiller Plant Design Application Guide AG 31-003, McQuay Air Conditioning, Revised Feb. 2001, pp. 1-22.
Grimm, Niles R., et al, HVAC Systems and Components Handbook, Second Edition, Section 6; 8 pages.
Jolly, Sanjeev, P.E., et al., Inlet Air Cooling for a Frame 7EA based Combined Cycle Power Plant, Presented at Power-Gen International, Dallas, Texas, Dec. 9-11, 1997, pp. 1-12.
Turbine Inlet Chilling System; Qaseem Power Plant Extension; GE International Power Systems, Sep. 1997;pp. 1-22.
Ondryas, Igor et al. , Options in Gas Turbine Power Augmentation using Inlet Air Chilling, Jun. 11, 1990, The American Society of Mechanical Engineers, Article No. 90-GT-250, pp. 1-10.*
American Society of Heating, Refrigerating and Air-Conditioning Engineers, Inc., Chilled Water Storage; Design Guide for Cooled Thermal Storage; cover page; pp. 4-1 to 4-7; 4-10 to 4-18; 4-24 to 4-26.
Ondryas, et al., Options in Gas Turbine Power Augmentation Using Inlet Air Chilling, presented at the Gas Turbine and Aeroengine Congress and Exposition, Jun. 11-14, 1990, Brussels, Belgium.
Holman, J.P., Thermodynamics, McGraw Hill Kogakusha, 2nd ed., Tokyo 1974, pp. 452-453.

* cited by examiner

*Primary Examiner* — William H Rodriguez
(74) *Attorney, Agent, or Firm* — Haynes and Boone, LLP

(57) ABSTRACT

[A method for cooling inlet air to a gas turbine is provided. For example, a method is described including passing inlet air through a cooling coil that includes an opening for receiving the inlet air and that is operably connected to a gas turbine power plant. The gas turbine power plant may include at least one gas turbine, and at least one gas turbine inlet which receives the inlet air. The method may further include passing circulating water through a water chiller at a first flow rate to reduce the temperature of the circulating water, the water chiller including a conduit through which the circulating water is capable of passing and passing the circulating water having the first flow rate through the cooling coil in an amount sufficient to lower the temperature of the inlet air. Additionally, the method may include reducing the flow rate of the circulating water passing through the water chiller, passing the circulating water through a water chiller at a second flow rate to reduce the temperature of the circulating water, the second flow rate being lower than the first flow rate, and passing the circulating water having the second flow rate through the cooling coil in an amount sufficient to lower the temperature of the inlet air.] *A method and system for cooling inlet air to a gas turbine is provided. In order to maintain a desired level of efficiency for a gas turbine plant, water is passed through a chiller to lower the water temperature. The cooled water is then circulated through coils disposed in the inlet air of the gas turbine, thereby cooling the inlet air to the gas turbine. The system may include a thermal energy storage tank for storing chilled water prior to circulation through the coils. The system may also utilize an air temperature set point selected to achieve a desired output or to meet load requirement for the gas turbine plant. The temperature or flow rate of the cooled water may be adjusted to achieve the selected air temperature set point.*

82 Claims, 9 Drawing Sheets

CONSTANT FLOW & VARIABLE LCWT W/FIXED 12 ROW COIL DESIGN AT TYPICAL 16F DELTA T DESIGN WITH SINGLE STAGE COOLING.

| EDB | EWB | LAT | COIL EWT | COIL LWT | ΔT WATER | GPM | BTU/Hr | TONS | GPM/TON | COIL P.D. WATER | SYSTEM C.W.P.D |
|---|---|---|---|---|---|---|---|---|---|---|---|
| 90 | 75 | 50 | 42.9 | 59.4 | 16.5 | 7840 | 4655999 | 5432 | 1.443 | 25.2 | 151.2 |
| 90 | 70 | 50 | 44.6 | 57.1 | 12.5 | 7840 | 3549917 | 4142 | 1.893 | 24.9 | 149.4 |
| 90 | 65 | 50 | 46.6 | 55.8 | 9.2 | 7840 | 2567318 | 2995 | 2.618 | 24.7 | 148.2 |
| 90 | 60 | 50 | 47.1 | 55.8 | 8.7 | 7840 | 2459716 | 2870 | 2.732 | 24.7 | 148.2 |
| 90 | 55 | 50 | 47.1 | 55.8 | 8.7 | 7840 | 2448629 | 2857 | 2.744 | 24.7 | 148.2 |
| 80 | 55 | 50 | 47.7 | 54.3 | 6.6 | 7840 | 1849283 | 2157 | 3.634 | 24.7 | 148.2 |
| 70 | 55 | 50 | 48.4 | 52.9 | 4.5 | 7840 | 1231395 | 1437 | 5.457 | 24.5 | 147.0 |
| 60 | 55 | 50 | 48.8 | 51.5 | 2.7 | 7840 | 768474 | 897 | 8.745 | 24.5 | 147.0 |

| CHILLED W. PUMP HP | CHILLER LCWT | CHILLER ECWT | DOWNSTREAM CHILLER ΔT | DOWNSTREAM CHILLER TONS | PARALLEL CHILLERS RUNNING |
|---|---|---|---|---|---|
| 352.2 | 42.9 | 59.4 | 16.5 | 2716 | 2 |
| 348.0 | 44.6 | 57.1 | 12.5 | 2071 | 2 |
| 345.2 | 46.6 | 55.8 | 9.2 | 1498 | 2 |
| 345.2 | 47.1 | 55.8 | 8.7 | 1435 | 2 |
| 345.2 | 47.1 | 55.8 | 8.7 | 1428 | 2 |
| 345.2 | 47.7 | 54.3 | 6.6 | 2157 | 1 |
| 342.4 | 48.4 | 52.9 | 4.5 | 1437 | 1 |
| 342.4 | 48.8 | 51.5 | 2.7 | 897 | 1 |

FIG. 7A

2 PUMP VARIABLE FLOW & VARIABLE TEMPERATURE LCWT WITH FIXED 12 ROW 4 PASS COIL & 2 STAGE COOLING

| EDB | EWB | LAT | COIL EWT | COIL LWT | △T WATER | GPM | BTU/Hr | TONS | GPM/TON | FPS | P.D. WATER | P.D. | DOWNSTREAM CHILLER LCWT |
|---|---|---|---|---|---|---|---|---|---|---|---|---|---|
| 90 | 75 | 50 | 39.9 | 62.6 | 22.7 | 5810 | 4653680 | 5429 | 1.07 | 3.8 | 15.0 | 90.0 | 39.9 |
| 90 | 70 | 50 | 42.4 | 59.4 | 17.0 | 5810 | 3543127 | 4134 | 1.41 | 3.8 | 14.8 | 88.8 | 42.4 |
| 90 | 70 | 50 | 38.5 | 62.6 | 24.1 | 4099.9 | 3550564 | 4142 | 0.99 | 2.7 | 8.1 | 48.6 | 38.5 |
| 90 | 65 | 50 | 45.4 | 57.9 | 12.5 | 5810 | 2589987 | 3022 | 1.92 | 3.8 | 14.6 | 87.6 | 45.4 |
| 90 | 65 | 50 | 43.2 | 61.2 | 18.0 | 4099.9 | 2615303 | 3051 | 1.34 | 2.7 | 7.9 | 47.4 | 43.2 |
| 90 | 60 | 50 | 46.2 | 58.0 | 11.8 | 5810 | 2462553 | 2873 | 2.02 | 3.8 | 14.6 | 87.6 | 46.2 |
| 90 | 60 | 50 | 44.6 | 61.3 | 16.7 | 4099.9 | 2460459 | 2871 | 1.43 | 2.7 | 7.9 | 47.4 | 44.6 |
| 90 | 55 | 50 | 46.3 | 58.0 | 11.7 | 5810 | 2462553 | 2873 | 2.02 | 3.8 | 14.6 | 87.6 | 46.3 |
| 90 | 55 | 50 | 44.7 | 61.3 | 16.6 | 4099.9 | 2445393 | 2853 | 1.44 | 2.7 | 7.9 | 47.4 | 44.7 |

| DOWNSTREAM CHILLER ECWT | DOWNSTREAM CHILLER △T | DOWNSTREAM CHILLER TONS | UP CHILLERS LCWT | UP CHILLERS ECWT | UPSTREAM CHILLER △T | UPSTREAM CHILLER TONS |
|---|---|---|---|---|---|---|
| 50.3 | 10.4 | 2497 | 50.3 | 62.6 | 12.3 | 2932 |
| 50.2 | 7.8 | 1901 | 50.2 | 59.4 | 9.2 | 2232 |
| 49.6 | 11.1 | 1905 | 49.6 | 62.6 | 13.0 | 2237 |
| 51.2 | 5.8 | 1390 | 51.2 | 57.9 | 6.8 | 1632 |
| 51.5 | 8.3 | 1404 | 51.5 | 61.2 | 9.7 | 1648 |
| 51.6 | 5.4 | 1322 | 51.6 | 58.0 | 6.4 | 1551 |
| 52.3 | 7.7 | 1320 | 52.3 | 61.3 | 9.0 | 1550 |
| 51.7 | 5.4 | 1322 | 51.7 | 58.0 | 6.3 | 1551 |
| 52.3 | 7.6 | 1312 | 52.3 | 61.3 | 9.0 | 1541 |

FIG. 7B

SYSTEM AND METHOD FOR CHILLING INLET AIR FOR GAS TURBINES

Matter enclosed in heavy brackets [ ] appears in the original patent but forms no part of this reissue specification; matter printed in italics indicates the additions made by reissue.

CROSS-REFERENCE TO RELATED APPLICATIONS

This application *is a continuation reissue of reissue U.S. patent application Ser. No. 12/661,265, filed on Mar. 12, 2010, now U.S. Pat. No. Re. 44,079, which is a reissue of U.S. Pat. No. 7,343,746 issued on Mar. 18, 2008, which* is a continuation of U.S. patent application Ser. No. 10/206,856, filed Jul. 26, 2002, now U.S. Pat. No. 6,769,528 which is a continuation-in-part of U.S. patent application Ser. No. 09/961,711, filed Sep. 24, 2001, now U.S. Pat. No. 6,470,686, which is a continuation of U.S. patent application Ser. No. 09/369,788, filed Aug. 6, 1999, now U.S. Pat. No. 6,318,065.

BACKGROUND OF INVENTION

1. Field of the Invention

This invention relates broadly to cooling inlet air to a gas turbine.

2. Description of Related Art.

A conventional gas turbine system includes: an air compressor for compressing the turbine inlet air; a combustion chamber for mixing the compressed air with fuel and combusting the mixture, thereby producing a combustion gas; and a power turbine that is driven by the combustion gas, thereby producing an exhaust gas and useful power.

Over the years, various technologies have been employed to increase the amount of useful power that the power turbine is able to produce. One way of increasing the power output of a gas turbine is to cool the turbine inlet air prior to compressing it in the compressor. Cooling causes the air to have a higher density, thereby creating a higher mass flow rate through the turbine. The higher the mass flow rate through the turbine, the more power the turbine produces. Cooling the turbine inlet air temperature also increases the turbine's efficiency.

Various systems have been devised for chilling the inlet air to the compressor. One such system uses evaporative cooling, wherein ambient temperature water is run over plates or over a cellular media inside of a chamber, thereby creating thin films of water on each plate, or on the media. The turbine inlet air is then drawn through the chamber, and through evaporative cooling, the air is cooled to near the wet bulb temperature. This system is limited to cooling the air to the wet bulb temperature, which is dependent upon the atmospheric conditions at any given time. Another system uses a chiller to chill water that is then run through a coil. The inlet air is then drawn through the coil to cool the air. This system requires parasitic power or steam to drive the chilling system which has the further drawback that when inlet air cooling is needed the most, i.e. during the day when the temperature is the highest, is also the time when power demand from the turbine is the highest, i.e. during the day when power users are in operation. In order to run the chiller, power from the turbine is required, but this power is needed by the users of the turbines power. On the other hand, when cooling is needed the least, i.e. at night when the temperatures are the lowest, surplus power from the turbine is available because the consumers of the turbine's power are largely not in operation. Accordingly, a continuing need exists for a turbine inlet air cooling system which: would efficiently cool turbine inlet air; would take advantage of surplus power available during times of low consumer power demand; and would not drain the system of power during times of high consumer power demand.

SUMMARY OF INVENTION

A. Inlet Air Cooling

Described in greater detail below is a method for chilling inlet air to a gas turbine power plant, which may include: providing a system of circulating chilling water including a chilling system; providing an inlet air chiller for lowering the temperature of the inlet air being fed to a gas turbine compressor through heat transfer between the circulating chilling water and the inlet air, providing a thermal water storage tank which is operably connected to the system of circulating chilling water, the thermal water storage tank containing chilling water having a bottom; during a charge cycle, removing a first portion of chilling water from the thermal water storage tank, passing the removed first portion of water through the chilling system to lower the temperature of the removed first portion of water and to provide a chilled removed first portion of water, and then introducing the chilled removed first portion of water into the thermal water storage tank at a point proximate the bottom of the tank, wherein the chilled removed first portion of water is introduced to the tank in an amount sufficient to lower the average temperature of the chilling water in the thermal water storage tank; and during a discharge cycle, chilling the inlet air by removing a second portion of chilling water from the thermal water storage tank, from a point proximate the bottom of the tank and then passing the second portion of chilling water to the inlet air chiller to make heat transfer contact between the second portion of chilling water and the inlet air, such that the temperature of the inlet air is lowered.

In another method that is described herein, the average temperature of the chilling water in the tank may be lowered to about 33° F. to about 40° F. during the charge cycle and may be raised to about 60° F. to about 70° F. during the discharge cycle. In another specific embodiment, the times of the charge and discharge cycles may be such that, before the temperature of the chilling water proximate the bottom of the tank reaches about 36° F. during the discharge cycle, the charge cycle is initiated. In another specific embodiment of the method for chilling inlet air, the first portion of chilling water removed from the thermal water storage tank during the charge cycle may be removed through a top outlet. In yet another specific embodiment, the chilling water in the tank may have an average temperature that can be lowered during the charge cycle and raised during the discharge cycle. In a further specific embodiment of the claimed method, the discharge cycle may be carried out during the night-time and the charge cycle may be carried out during the day-time. In still another specific embodiment, the water level in the tank may remain substantially constant during the charge and discharge cycles. In still a further specific embodiment, the one or more chillers may be deactivated during the discharge cycle. In another specific embodiment, the discharge cycle may occur during peak power usage of the gas turbine power plant. In another specific embodiment, the discharge cycle may be performed after the removing of at least a portion of the volume of chilling water from the thermal water storage tank during the charge cycle, such that the chilled removed water that is introduced into the thermal water storage tank at a point proximate the bottom of the tank may remain substantially at the point proximate the bottom of the tank. In another specific embodiment, the first portion of chilling water removed during the charge cycle may be sufficient to chill substantially all of the water in the thermal water storage tank to a temperature below the temperature of maximum water density. In yet another specific embodiment of the claimed method, the second portion of chilling water removed during the discharge cycle may be substantially all of the chilling water in the tank. In a further specific embodiment of the method of the present invention, the thermal water storage tank contains a volume of chilling water that is sufficient to lower the temperature of the inlet air to a range of from about 45° F. to about 55° F. for a period of between about 4 hours to about 12 hours.

Also described herein is a method of chilling water delivered to the air chiller in a gas turbine power plant system having at least one air chiller for lowering the temperature of inlet air, at least one air compressor for compressing the inlet air, at least one combustor for burning the compressed air and providing combustion gas, and at least one power turbine driven by the combustion gas for producing useful power, a method of chilling water delivered to the air chiller, the method including the steps of: providing the at least one air chiller with an air chiller inlet that may receive water, and an air chiller outlet that may expel water; providing a thermal water storage tank, having a bottom portion, a top portion, at least one bottom opening proximate the bottom portion and at least one top opening proximate the top portion, and containing a volume of stored water having an average temperature, and temperature of maximum water density; performing a charge cycle, by introducing through the at least one bottom opening a first quantity of chilled water which has a chilled water temperature that is below the temperature of maximum water density, thereby lowering the average temperature of the volume of stored water, wherein the first quantity of chilled water being introduced through the bottom opening is sufficient to lower the average temperature of the volume of stored water to a temperature that is below the temperature of maximum water density; and performing a discharge cycle by removing a second quantity of chilled water from the tank through the at least one bottom opening and passing the second quantity of chilled water to the air chiller inlet, to lower the temperature of the inlet air, thereby raising the temperature of the second quantity of chilled water and providing high temperature water, then introducing the high temperature water to the at least one top opening in the tank.

In yet another method of chilling water, the temperature of maximum water density may be from about 20° F. to about 39.2° F. In another specific embodiment, the temperature of maximum water density may be about 39.2° F. In another specific embodiment, the temperature of the stored water may have a temperature of from about 34° F. to about 40° F. In yet another specific embodiment of the claimed method the temperature of the stored water may have a temperature corresponding to the maximum water density of about 39.2° F. In another specific embodiment sodium nitrate may be added to depress the freezing temperature of the water thereby allowing stored water to be in the range of about 25° F. to about 34° F. In another specific embodiment of the method of the present invention, the useful power produced by the power turbine may be consumed at a variable rate, and the charge cycle may be performed when the rate is at a minimum. In a further specific embodiment, the useful power produced by the power turbine may be consumed at a variable rate, and the discharge cycle may be performed when the rate is at a maximum. In yet another specific embodiment of the method of the present invention, the quantity of water expelled during the discharge cycle may be less than the volume of stored water. In a further specific embodiment, the quantity of chilled water may be chilled by passing water through at least one chiller. In still another specific embodiment of the claimed method, the temperature of inlet air may be lowered from a high temperature of from about 85° F. to about 95° F. to a low temperature of from about 45° F. to about 55° F. In still a further specific embodiment, the high temperature may be about 90° F. and the low temperature may be about 50° F. In yet another specific embodiment, the output of the gas turbine power plant system may be from about 50 megawatts to about 250 megawatts.

Also described below is a gas turbine power plant system, wherein the system includes: one or more air chillers for lowering the temperature of inlet air; one or more air compressors for compressing the inlet air; one or more combustors for burning the compressed air and providing combustion gas; and one or more power turbines driven by the combustion gas for producing useful power, and an improvement that may include: a thermal water storage tank for containing chilled water, wherein the thermal water storage tank has a bottom portion with a bottom outlet and a top portion, and the tank is operably connected to the air chiller such that the chilled water passes from the bottom outlet to the air chiller to lower the temperature of the inlet air and is returned to the thermal water storage tank; and a water chilling system for chilling the water in the thermal water storage tank, wherein the water chilling system is configured to receive high temperature water from the top portion of the tank, and wherein the system is configured to introduce low temperature water to the bottom portion of the tank, such that the average temperature of the water in the tank is lowered; and wherein the water chilling system includes one or more chillers for lowering the temperature of the high temperature water from the top portion of the tank to provide low temperature water.

In an example of such a gas turbine power plant system, the thermal water storage tank may have a bottom, and the bottom outlet may be positioned at a height that is less than about 10 feet from the bottom of the tank. In another specific embodiment of the gas turbine power plant system, the thermal water storage tank may have a bottom, and the bottom outlet may be positioned at a height that is less than about 5 feet from the bottom of the tank. In another specific embodiment, the thermal water storage tank may have a bottom, and the bottom outlet may be positioned at a height that is less than about 18 inches from the bottom of the tank. In another specific embodiment, the tank may have a top outlet and a bottom inlet such that, in a charge cycle the high temperature water may be removed through the top outlet and may be fed to the one or more chillers, and the low temperature water may be introduced to the tank through the bottom inlet. In a further specific embodiment of the gas turbine power plant system, the tank may have a bottom outlet such that, in a discharge cycle, chilling water may be removed from the tank through the bottom outlet. In still a further specific embodiment of the gas turbine power plant system, the tank may have a bottom outlet such that, in a discharge cycle, chilling water may be removed from the tank through the bottom outlet, fed to the air chiller and is returned to the tank, bypassing the one or more chillers of the water chilling system. In still a further specific embodiment of the gas turbine power plant system, the top portion may be separated from the bottom portion by a thermocline.

In yet another example, during the charge cycle, the bottom inlet may receive a quantity of chilled water that is sufficient to supply the air chiller with water having a temperature below the temperature of maximum water density for four or more hours. In another specific embodiment, during the charge cycle, the bottom inlet may receive a quantity of chilled water that is sufficient to supply the air chiller with water having a temperature below the temperature of maximum water density for eight or more hours. In still another embodiment, during the charge cycle, the bottom inlet may receive a quantity of chilled water that is sufficient to supply the air chiller with water having a temperature below the temperature of maximum water density for twelve or more hours.

In still another example, the thermal water tank may have a height of from about 25 feet to about 70 feet. In yet another specific embodiment, the thermal water tank may have a diameter of from about 50 feet to about 250 feet. In another specific embodiment, the thermal water tank may have a diameter, and a height, and the diameter may be greater than the height. In yet another specific embodiment of the claimed invention, the volume of stored water may be greater than about eight hundred thousand gallons. In still a further specific embodiment, the temperature of the water in the top portion may be about 15° F. to about 35° F. greater than the temperature of the water in the bottom portion. In another specific embodiment, the thermal water storage system may include a plurality of thermal water storage tanks, each of the plurality of tanks may have a bottom inlet and a bottom outlet, and each of the plurality of tanks may have a top inlet and a top outlet. In another specific embodiment, the bottom inlet may have a bottom diffuser, and the top inlet may have a top diffuser, whereby the water entering the bottom inlet is diffused, and the water entering the top inlet may be diffused. In yet another specific embodiment, the temperature of the water in the top portion of the tank may have a temperature ranging from about 60° F. to about 70° F. In still a further specific embodiment, the temperature of the water in the bottom portion of the tank may have a temperature that is above the freezing temperature. In another specific embodiment, the water chilling system may include at least one mechanical chiller. In still another specific embodiment of the present invention, the water chilling system may include at least one absorption chiller. In still a further specific embodiment, the water chilling system may include at least one mechanical chiller and at least one absorption chiller. In yet another specific embodiment, the mechanical chiller may receive chilled water from the absorption chiller, and the mechanical chiller may further chills the chilled water. In another specific embodiment, the gas turbine power plant system may additionally including a heat recovery steam generator and a steam turbine, wherein the absorption chiller may be driven by steam from the heat recovery steam generator. Another specific embodiment of the gas turbine power plant system may additionally include a heat recovery steam generator and a steam turbine, wherein the absorption chiller is driven by back pressure from the steam turbine exhaust. In another specific embodiment, the inlet air may be lowered from a first temperature of about from 85° F. to about 95° F. to a second temperature of from about 45° F. to about 55° F. in the inlet air chiller. In yet another embodiment, the first temperature may be about 90° F. and the second temperature may be about 50° F. In another specific embodiment of the gas turbine power plant system, the chilling water being fed to the inlet air chiller may have a temperature of from about 34° F. to about 40° F. In another specific embodiment, the gas turbine power plant system may additionally include a steam turbine and a heat recovery steam generator, and the heat recovery steam generator may receive exhaust gas from the power turbine and may provide high pressure steam to the steam turbine, and the steam turbine may provide low pressure steam.

B. Additional Methods and Systems

Embodiments of the invention additionally include passing inlet air through a cooling coil that includes an opening for receiving the inlet air and that is operably connected to a gas turbine power plant. The gas turbine power plant may include at least one gas turbine, and at least one gas turbine inlet which receives the inlet air. The method may further include passing circulating water through a water chiller at a first flow rate to reduce the temperature of the circulating water, the water chiller including a conduit through which the circulating water is capable of passing and passing the circulating water having the first flow rate through the cooling coil in an amount sufficient to lower the temperature of the inlet air. Additionally, the method may include reducing the flow rate of the circulating water passing through the water chiller, passing the circulating water through a water chiller at a second flow rate to reduce the temperature of the circulating water, the second flow rate being lower than the first flow rate, and passing the circulating water having the second flow rate through the cooling coil in an amount sufficient to lower the temperature of the inlet air.

Additional embodiments may include providing a system of circulating liquid chilling water including a chilling system that includes a first mechanical chiller and a second mechanical chiller, the first and second mechanical chillers being arranged in series and passing at least a portion of the liquid chilling water through the first mechanical chiller and the second mechanical chiller, the liquid chilling water passing through the first mechanical chiller being lowered to a first temperature, and the liquid chilling water passing through the second mechanical chiller being lowered to a second temperature that is lower than the first temperature, thus providing a staged liquid chilling water temperature drop, wherein the staged liquid chilling water temperature drop is from about 20° F. to about 34° F. The method may further include providing an inlet air chiller, comprising a cooling coil through which liquid chilling water passes, for lowering the temperature of inlet air being fed to the compressor through heat transfer between the liquid chilling water passing through the cooling coil and the inlet air, wherein the inlet air chiller provides a liquid chilling water temperature rise of from about 20° F. to about 34° F. and chilling the inlet air by directing the liquid chilling water to the inlet air chiller and passing the liquid chilling water through the cooling coil of the inlet air chiller to make heat transfer contact between the liquid chilling water and the inlet air. Preferably, the method additionally includes adding potassium formate to the circulating water in an amount sufficient to depress the freezing point of the circulating water. In the alternative, or additionally, the method may include contacting the inlet air leaving the cooling coil with a control system, a temperature sensor, and a relative humidity sensor to monitor the leaving air temperature and relative humidity of the leaving air and varying the flow or the temperature of the circulating water to maintain a relative humidity of the coil to below about 95% to about 99% RH for optimal efficiency in a combined cycle system.

Additional embodiments may include a system for chilling inlet air for a gas turbine power plant including passing inlet air through a cooling coil that includes an opening for receiving the inlet air and that is operably connected to a gas turbine power plant that includes at least one gas turbine, and at least one gas turbine inlet which receives the inlet air, passing circulating water through a water chiller at a first flow rate to reduce the temperature of the circulating water, the water chiller including a conduit through which the circulating water is capable of passing and passing the circulating water having the first flow rate through the cooling coil in an amount sufficient to lower the temperature of the inlet air to a desired air temperature setpoint. The system may further include reducing the flow rate of the circulating water passing through the water chiller during lower ambient off-design periods to maintain the desired air temperature setpoint, passing the reduced flowrate circulating water through the water chiller at a second flow rate and reducing the temperature of the circulating water to maintain the desired air temperature setpoint, the second flow rate being lower than the first flow rate and passing the circulating water having the second flow rate through the cooling coil in an amount sufficient to lower the temperature of the inlet air to the desired air temperature setpoint. The method may additionally include reducing the flow rate of the circulating water passing through the two or more sequentially positioned compressors during lower ambient off-design conditions to maintain a higher circulating water delta T thereby allowing warmer water to pass through the upstream compressor thus improving the efficiency at partial load.

Certain embodiments include passing the circulating water through a heater prior to passing the circulating water through the cooling coil, in which the circulating water temperature is increased to a temperature that is higher than the temperature of the circulating water leaving the cooling coil and higher than the temperature of the air entering the cooling coil to maintain the minimum desired leaving air temperature.

Certain embodiments include adding an additive to the circulating water in an amount sufficient to depress the freezing point of the circulating water. Certain embodiments may further include adding an additive to the circulating water in an amount sufficient to depress the freezing point of the circulating water and minimizing any negative performance derating due to the additive effect on the heat transfer properties of water. Certain embodiments may include adding a salt additive to the circulating water in an amount sufficient to depress the freezing point of the circulating water. The salt additive may be added to the circulating water in an amount sufficient to depress the freezing point of the circulating water to a point that would specifically provide for protection of the system during low ambient temperature operation and to protect the system during shut-down periods. Certain embodiments may include adding sodium nitrate to the circulating water in an amount sufficient to depress the freezing point of the circulating water. In yet other embodiments, the method includes adding potassium formate to the circulating water in an amount sufficient to depress the freezing point of the circulating water.

In certain embodiments, the method includes determining a set point and reducing the flow rate of the circulating water passing through the water chiller when the temperature difference between the circulating water entering the cooling coil and the circulating water leaving the cooling coil reaches the set point. Certain embodiments include determining a leaving chilled water temperature set point and increasing the setpoint at reduced off-design ambient temperatures to maintain the desired air temperature off the coil until the temperature difference between the circulating water entering the cooling coil and the circulating water leaving the cooling coil reaches a minimum set point and reducing the flow rate of the circulating water passing through the water chiller and reducing the leaving chilled water temperature setpoint to maintain the desired air temperature off the coil.

Certain embodiments include passing the circulating water through a pump prior to passing the circulating water through the water chiller. In yet other embodiments, the method includes passing the circulating water through a pump prior to passing the circulating water through the water chiller, reducing the circulating water flowrate, and decreasing the temperature of the circulating water to maintain the desired leaving air temperature. Certain embodiments include passing the circulating water through one or more pumps and reducing the flow rate of the circulating water by shutting off at least one of the one or more pumps. Optionally, the method may include passing the circulating water through one or more pumps mounted in parallel and reducing the flow rate of the circulating water by shutting off at least one of the one or more pumps during partial load conditions. In yet other embodiments, the method includes passing the circulating water through one or more pumps and reducing the flow rate of the circulating water by lowering the speed (RPM) of the pump via a variable frequency drive on the one or more pump motors.

In certain embodiments, the gas turbine inlet air temperature leaving the cooling coil is about 40° F. to about 60° F. Certain embodiments include providing a temperature sensor contacting the inlet air leaving the cooling coil to monitor the inlet air temperature. In yet other embodiments, the method includes providing a temperature sensor contacting the inlet air leaving the cooling coil to monitor the inlet air temperature and lowering the temperature of the inlet circulating water when the inlet air temperature increases above the setpoint. In certain other embodiments, the method includes providing a wet bulb temperature sensor to monitor the ambient air wet bulb temperature entering the cooling coil. In yet other embodiments, the method includes providing a control system and a temperature sensor contacting the inlet air leaving the cooling coil to monitor the inlet air temperature and lowering the circulating water flowrate when the temperature difference between the circulating water entering the cooling coil and the circulating water leaving the cooling coil decreases to from about 50% to about 90% of the difference between the ambient air wet bulb temperature entering the cooling coil and the temperature of the leaving air.

In certain embodiments, the chilled water temperature entering the cooling coil is about 34° F. to about 45° F. In certain embodiments, the cooling coil includes a multipass cooling coil. In other embodiments, the cooling coil includes a four pass cooling coil. In yet other embodiments, the cooling coil includes a six pass cooling coil.

In certain embodiments, the water chiller includes an evaporator. Certain embodiments additionally include providing a thermal water storage tank which is operably connected to the water chiller. In yet other embodiments, the method includes providing a thermal water storage tank which is operably connected to the water chiller and during a charge cycle, removing a first portion of circulating water from the thermal water storage tank, passing the removed first portion of water through the water chiller to lower the temperature of the removed first portion of circulating water and to provide a chilled removed first portion of water, and then introducing the chilled removed first portion of water into the thermal water storage tank, wherein the chilled removed first portion of water is introduced to the tank in an amount sufficient to lower the average temperature of the circulating water in the thermal water storage tank. Certain embodiments include providing a thermal water storage tank which is operably connected to the water chiller and during a discharge cycle, chilling the inlet air by removing a second portion of water from the thermal water storage tank and then passing the second portion of water to the inlet cooling coil to make heat transfer contact between the second portion of the circulating water and the inlet air, such that the temperature of the inlet air is lowered.

Certain embodiments include controlling the inlet air temperatures of multiple gas turbines by throttling the flow of circulating water to the cooling coil of the gas turbine which has the lowest turbine inlet air temperature. In yet other embodiments, the method includes controlling the inlet air temperatures of multiple gas turbines by throttling the flow of circulating water to the cooling coil of the gas turbine which has the lowest turbine inlet air temperature and resetting the supply circulating water setpoint higher once the last gas turbine circulating water is throttled to maintain the desired turbine inlet air temperature until at least one of the gas turbines meets the desired inlet air temperature without throttling more than about 25% of fully open.

Additional embodiments include passing inlet air through a cooling coil, passing circulating water through a water chiller to reduce the temperature of the circulating water and to provide chilled water, passing the chilled water through the cooling coil to lower the temperature of the inlet air and to provide chilled inlet air and supplying water in a fog to the chilled inlet air downstream of the cooling coil in an amount sufficient to supersaturate the already saturated chilled inlet air.

Certain embodiments include removing a portion of water from the inlet air via the condensate off of the cooling coil and then reintroducing that water through a high pressure spray or fog to the chilled inlet air. In yet other embodiments, the method includes providing a compressor within the gas turbine power plant, in which supplying water (fog) to the chilled inlet air includes entraining water in the chilled inlet air in an amount sufficient to lower the temperature of at least one stage of the compressor. In certain embodiments, the method includes passing the chilled inlet air through a compressor to vaporize the water in the chilled inlet air and cool interstages of the compressor. In certain embodiments, the chilled inlet air is at a saturation level. In certain embodiments, the chilled inlet air is at a supersaturation level after the water is supplied. The method may additionally include removing a portion of water from the inlet air via the condensate off of the cooling coil to be stored until the chilling system is off and then reintroducing that water to be evaporated in the airstream by means of a high pressure spray or fog and thereby achieving evaporative cooling to near the wetbulb temperature.

BRIEF DESCRIPTION OF THE DRAWINGS

FIG. 7 is a chart showing example data.

DETAILED DESCRIPTION

Specific embodiments of the invention will now be described. However, a person of ordinary skill in the art will recognize that the invention will actually be defined by one or more of the claims, rather than the description below. Depending on the context, all references to the "invention" below may in some cases refer to certain specific embodiments only. In other cases it will be recognized that references to the "invention" will refer to subject matter recited in one or more, but not necessarily all, of the claims.

A. Inlet Air Cooling

Figure 1:
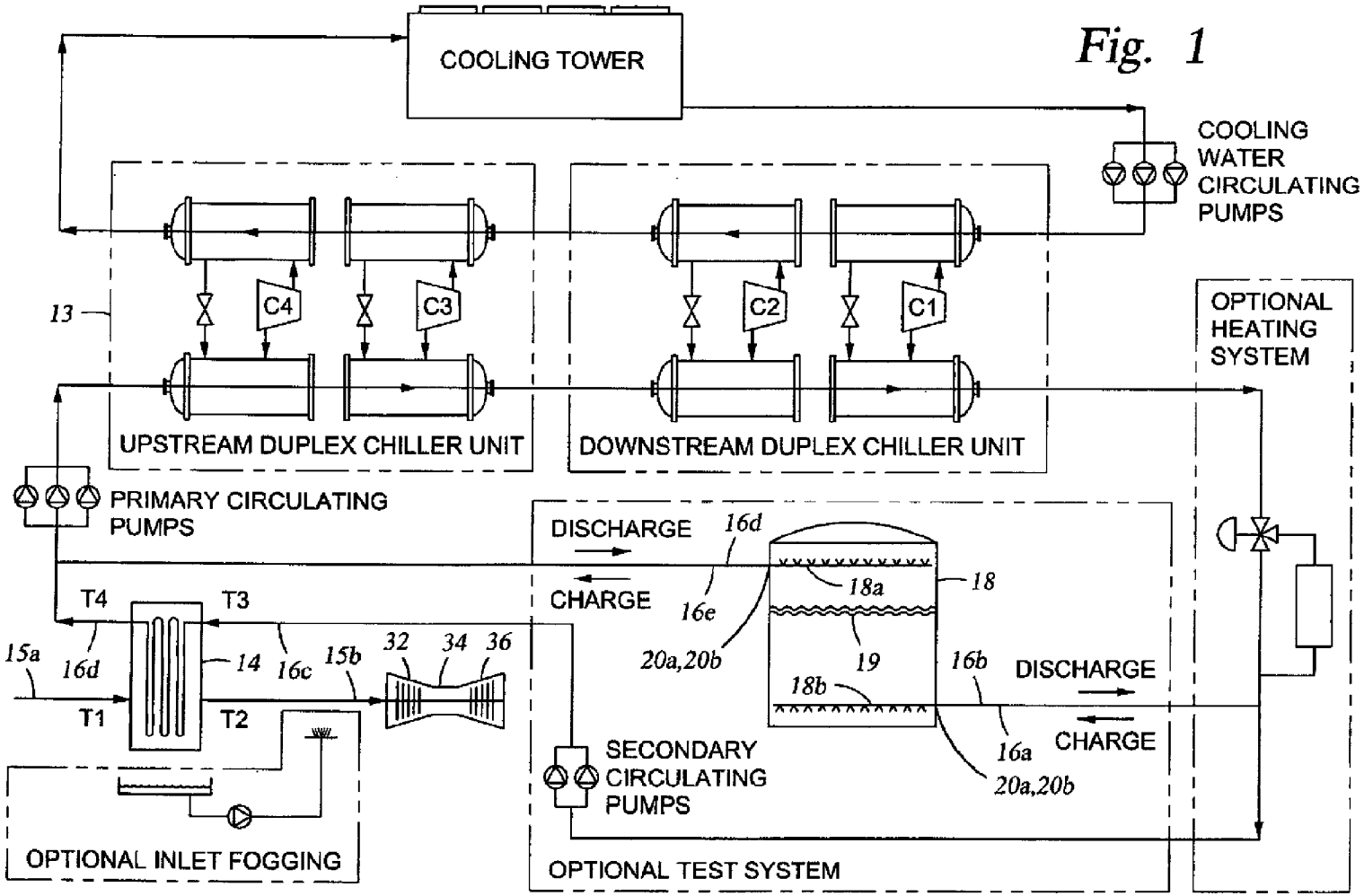
FIG. 1 is a schematic diagram of a sequential turbine inlet air cooling system showing optional enhancements.
Figure 2A:
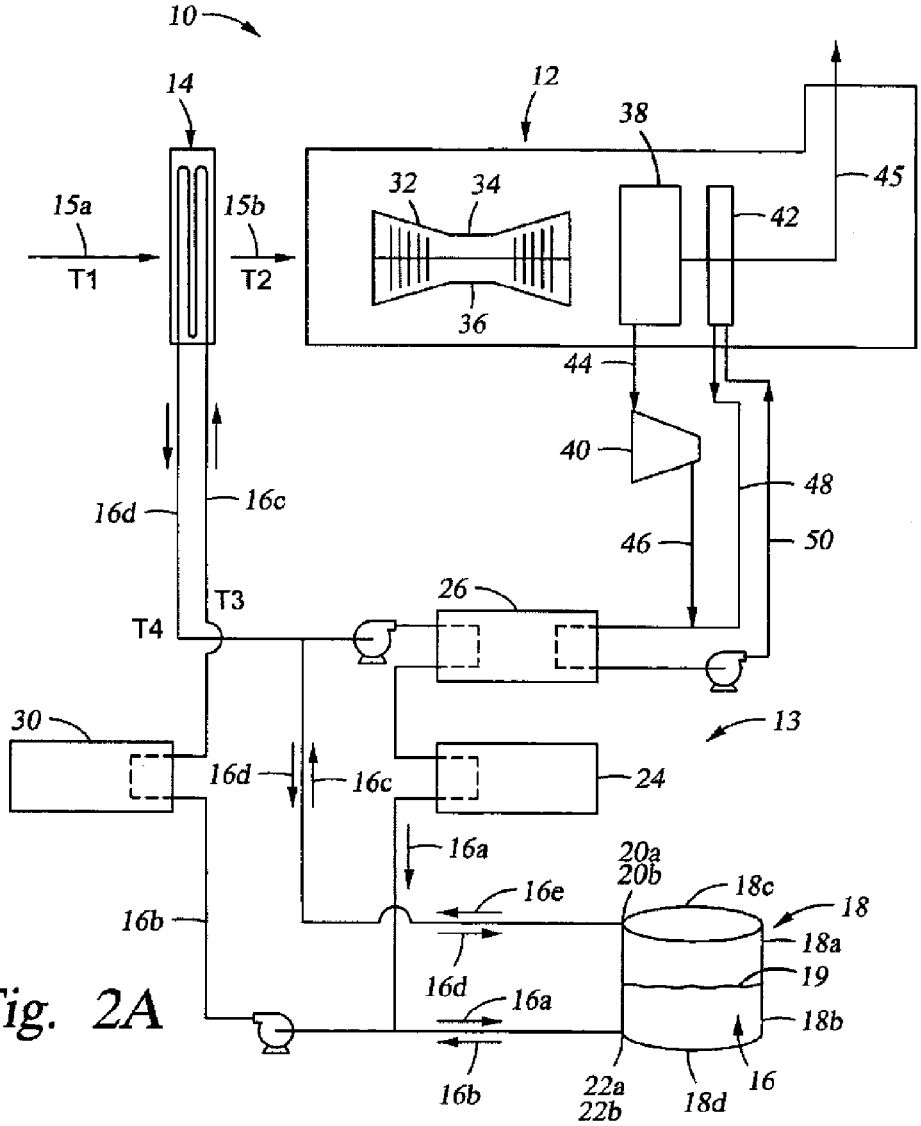
FIGS. 2A and 2B are schematic diagrams of an alternative embodiment of the turbine inlet air cooling system wherein the gas turbine exhaust heat is used.

Generally, referring to FIG. 1, the overall apparatus 10 includes a conventional gas turbine system 12 having an air chiller 14, e.g., a conventional cooling coil, for lowering the temperature of inlet air, shown schematically by arrow 15a, from ambient temperature (T1, e.g., about 90° F. (about 32° C.), or in the range of from about 70° F. (about 21° C.) to about 85° F. (about 29° C.) to a range of from about 100° F. (about 38° C.) to about 115° F. (about 47° C.)), or to about 125° F. (about 52° C.) to provide compressor feed air, shown schematically by arrow 15b, having some lower temperature (T2, e.g., about 50° F. (about 10° C.), or in the range of about 45° F. (about 7° C.) to about 55° F. (about 13° C.)), or to about 60° F. (about 16° C.). The air chiller 14 can be a conventional cooling coil that provides for heat transfer contact, e.g., across a set of coils within the air chiller 14, between the circulating chilling water 16c (preferably at a T3 of about 34° F. (or about 1° C. to about 2° C.) to about 40° F. (or about 4° C. to about 5° C.)) and the inlet air 15a, forming chilled compressor feed air 15b, and resulting in a higher temperature circulating water 16d (T4, e.g., about 54° F. (about 12° C.) to about 60° F. (about 16° C.)). A preferred cooling coil may be specially circuited so as to achieve relatively high changes in the temperature of the water flowing through the tubes in the cooling coil. This rise in temperature is preferably in a range of about 20° F. (about 11° C.) to about 35° F. (about 19° C.) on a hot design day. As used herein a "design day" is the maximum temperature that the ambient air is expected to reach—the temperature upon which the system design is based. The chilled compressor feed air 15b may then be introduced to a conventional gas turbine (GT) compressor 32, where it is compressed, combined with fuel and burned in a conventional combustor 34 to produce a combustion gas that can be used for driving the power turbine 36, resulting in "exhaust gas." FIG. 2A shows one embodiment of the overall system as including only one gas turbine system 10, one air chiller 14, one water chilling system 13, and one optional tank 18. However, depending upon system requirements as well as geographical, geological, and other constraints, it may be desirable to have more than one gas turbine system 12, more than one air chiller 14, more than one water chilling system 13, or more than one tank 18.

FIG. 2A shows a combined cycle system whereby exhaust from the power turbine 36 can be passed through a heat recovery steam generator (HRSG) 38 to produce steam, shown schematically by arrow 44, and "stack gas," shown schematically by arrow 45. Further, in another embodiment of a combined cycle system, a heat recovery coil 42 may receive the exhaust gas 45 from the power turbine 36 and produce hot water or steam, shown schematically by arrow 48. The hot water or steam 48 produced either by the HRSG 38 or the heat recovery coil 42 may advantageously be used to supply power to an absorption chiller 26, the importance of which will be discussed below.

As mentioned, it is advantageous to lower the temperature of the inlet air 15a to a temperature T2 that is as low as possible. The change in air temperature from T1, before entering the air chiller 14, to T2, after exiting the air chiller 14, is referred to herein as ΔT. Even small increases in ΔT, i.e., lowering T2 can affect significant increases in the capacity of the gas turbine system. For example, in a particular gas turbine, an increase in ΔT of about 2.6° F. (about 1° C. to about 2° C.) may increase the turbine output by about one percent.

Included in FIG. 1 is a circulating water system or loop, which includes circulating chilling water 16 that circulates through the specially circuited, high ΔT air chiller 14 and back through chillers piped in series to an optional thermal water storage tank 18 for storing the chilling water 16. The term "loop" preferably refers to conventional pipage, e.g. pvc or steel pipes having valves (not shown) where appropriate. The features of this chilling water loop will now be described with reference to FIG. 1, where, for ease of comprehension, the water within the loop is referred to generally with numeral 16, and the various streams of water within the loop are referred to with the numeral 16 followed by an alphabetic character to distinguish between various streams of water where necessary.

The chilling water loop includes a water chilling system 13. The water chilling system 13 may include any number of conventional water chillers installed either in parallel or in series but preferably with at least two chillers piped in series so as to stage the temperature drop of the water into an intermediate and a lower temperature chiller. This saves power on the upstream chiller and makes the system more efficient. If the power plant is a combined cycle plant and if there is sufficient exhaust energy available from either the steam turbine exhaust (stream 46) or heat recovery coil (stream 48), then it is preferable as shown in FIG. 2A for the water chilling system 13 to include an absorption chiller 26 which may derive its power from the heat energy recovered from the HRSG 38, or the heat recovery coil 42, or both, and a mechanical chiller 24. The absorption chiller 26 and the mechanical chiller 24 are shown in series, as that is the preferred arrangement with the absorption chiller placed upstream of the mechanical chiller, however they may be placed in parallel depending upon system needs. If excess waste heat is not available at a sufficiently low cost, the upstream chiller is preferably a mechanical chiller. An object of the water chillers is to chill the chilling water 16 to a sufficiently low temperature so that the chilling water 16 can then be used to chill the inlet air 15a in the air chiller 14 with a minimum water flow rate and maximum water ΔT. Preferably, the temperature of the chilling water 16c is about 34° F. (about 1° C. to about 2° C.) to about 40° F. (about 4° C. to about 5° C.) prior to entering the air chiller 14. A number of conventional devices can be used to chill the water going to the water storage tank 18. For example, the chilling water can be chilled before it is ever introduced to the tank, by passing the chilling water 16d from the air chiller either through a mechanical chiller 24 or an absorption chiller 26 (driven by hot water or steam 44, 48 from the HRSG or LP steam 46 coming out of the steam turbine 40) to provide chilling water 16a that is then introduced to the tank 18. A hybrid chilling arrangement can also be used whereby both mechanical 24 and absorption 26 chillers are used in combination. The preferred arrangement is to circulate the warm water 16e from the tank 18 or the heated water 16d from the air chiller 14 to the upstream absorption (or mechanical) chiller 26 first where the water 16d will be chilled from range of about 54° F. (about 12° C.) to about 65° F. (about 19° C.) to a range of about 40° F. (or about 4° C. to about 5° C.) to about 48° F. (or about 8° C. to about 9° C.). The water 16d then circulates through the downstream mechanical chiller 24 where it may be chilled further to about 34° F. (or about 1° C. to about 2° C.) to about 40° F. (or about 4° C. to about 5° C.).

The thermal water storage tank 18 is preferably a thermally insulated vessel, having an upper opening or connection or top inlet/outlet 20. In other specific embodiments, e.g., where an open tank is used, the top "opening" or top inlet can be the open top of the tank, so that water can be piped into the tank through the top. The tank 18 may be made from any material having the strength and insulation qualities necessary for a thermal water storage tank, however, preferably, the tank 18 is constructed of steel or concrete. The top inlet/outlet 20 (also referred to herein as an "opening") both receives heated water 16d from the air chiller 14 during a discharge cycle, and expels heated water 16e during a charge cycle. (The charge and discharge cycles will be explained in further detail below) The thermal water storage tank 18 preferably also has a lower connection or bottom inlet/outlet 22 (or "opening"). The bottom inlet/outlet 22 both receives chilled water 16a from water chilling system 13 during the charge cycle, and discharges chilled water 16b to the air chiller 14 during the discharge cycle. Furthermore, the system shown in FIG. 1 also allows a "partial storage" strategy whereby the chilled water in the tank can be used to supplement the water produced by the chillers such that both can be provided to the air chiller 14 to allow longer periods of on-peak chilled air going to the gas turbine.

Preferably, in the system in FIG. 2A, the water 16 in the tank 18 is "stratified" according to temperature. That is, the lower temperature water (about 33° F. (about 0° C. to about 1° C.) to about 40° F. (about 4° C. to about 5° C.)) resides at the bottom of the tank. Broadly, the temperature at the bottom of the tank may be in the range of from about 33° F. (about 0° C. to about 1° C.) to about 40° F. (about 4° C. to about 5° C.). Preferably, the temperature of the water in the bottom of the tank is in the range of from about 33° F. (about 0° C. to about 1° C.) to about 36° F. (about 2° C. to about 3° C.). Most preferably the temperature of the water in the bottom of the tank is in the range of from about 33° F. (about 0° C. to about 1° C.) to about 34° F. (about 1° C. to about 2° C.). The higher temperature water (typically about 60° F. (about 16° C.) to about 70° F. (about 21° C.), typically having a lower density, remains at the upper portions of the tank.) Preferably, the entire tank 18 will be occupied by lower temperature water (about 33° F. (about 0° C. to about 1° C.) to about 34° F. (about 1° C. to about 2° C.)) after a charge cycle (discussed below) is completed. The tank should be capable of storing sufficient chilled water 16 to provide air cooling during an entire discharge cycle (discussed below). Further, the tank 18 should have a sufficient height so that adequate temperature gradients can be maintained. Preferably, the diameter of the tank 18 is greater than the height. An advantage of using the charge/discharge cycles, and other features of the present invention is realized with respect to the natural tendency of water to "stratify" according to temperature. Generally, in the temperature range of about 39.2° F. (about 4.0° C.) to about 212° F. (100° C.), water decreases in density as temperature increases. As a result, the colder water sinks to the bottom and the warmer water rises to the top, thereby forming uniform temperature strata or layers. Further, in the temperature range of about 32° F. (about 0° C.) to about 39.2° F. (4.0° C.), water tends to increase in density according to temperature. As a result, in this temperature range, the warmer water tends to sink to the bottom and the colder water rises to the top. Generally, pure water reaches its maximum density at about 39.2° F. (about 4.0° C.). However, depending upon atmospheric conditions, or if various chemicals are added to the water, the temperature of maximum water density may change. Therefore, if the charge/discharge cycles of the claimed invention are not performed, the coldest water does not sink to the bottom, but instead, water with a temperature of about 39.2° F. (about 4.0° C.) naturally tends to settle toward the bottom of the tank. The tank 18 of the claimed invention discharges warm water 16e from the top portion 18a of the tank 18, and receives chilled water 16a from the water chilling system 13, which is below the temperature of maximum water density, during the charge cycle into the bottom portion 18b through bottom inlet/outlet 22. In this manner, the coldest but not necessarily the heaviest water is forced into the bottom. Further, as mentioned, the charge cycle preferably is long enough and the charge flow rate is great enough to fill the entire tank 18 with the design cold water temperature by the end of the charge cycle. Even if the tank is not chilled with water that is below the temperature of maximum water density (i.e., below about 39.2° F.), the water 16 in the tank 18 is preferably not allowed to remain stagnant in the tank 18 long enough for the densest but not the coldest water to sink to the bottom of the tank 18. During the discharge cycle, water is preferably taken from the bottom portion 18b of the tank 18 through the bottom inlet/outlet 22 thereby ensuring that the coldest water is removed and directed to the air chiller 14. As it is preferable to have the coldest water remain in the bottom portion 18b of the tank 18, and have the warmest water remain in the top portion 18a of the tank 18; it is generally desirable to prevent unnecessary mixing or global movement of the water 16 in the tank 18. For this purpose, a diffuser 23a, 23b (FIG. 3) may be disposed adjacent the bottom inlet/outlet 22 and top inlet/outlet 20. Generally, the diffusers 23a, 23b tend to reduce the velocity of the water entering or leaving the tank to minimize any turbulent mixing.

It may also be advantageous to allow some of the chilled water to flow through the air chiller 14, during the charge cycle, to provide some cooling to the gas turbine. In this manner, the thermal water storage tank 18 will be charged with chilled water, and some cooling of the inlet air can also be accomplished.

Figure 3:
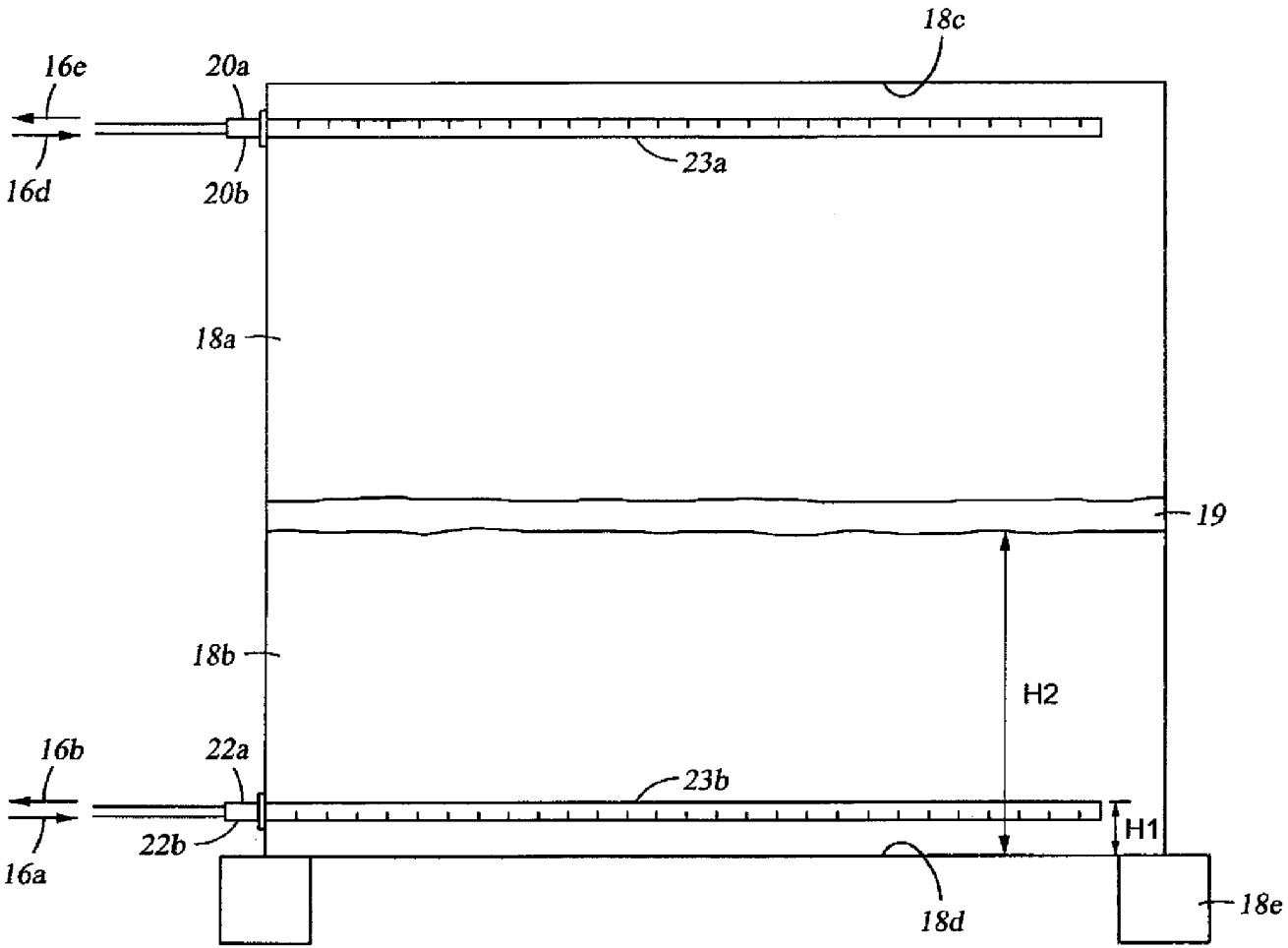
FIG. 3 is a side view of a storage tank.

Referring to FIG. 3, a preferred embodiment of the thermal water storage tank 18 will be discussed. The tank has a top 18c, a bottom 18d, and a foundation 18e. Top inlet 20b and top outlet 20a are shown as a single port or connection to the diffuser which is adapted to accommodate a bidirectional flow, i.e. either into the tank, 20b, or out of the tank, 20a. However, it should be noted that top inlet 20b and top outlet 20a may also be two separate ports or orifices, one being an inlet 20b, the other being an outlet 20a. The same is true for bottom inlet 22b and bottom outlet 22a, which are shown as a single ports in FIG. 3. As shown in FIG. 3, top diffuser 23a and bottom diffuser 23b are essentially long pieces of pipe or tubing with slots cut perpendicular to their length. In operation, the slots in top diffuser 23a point toward the top 18c of tank 18, and the slots in bottom diffuser 23b point toward the bottom 18d of tank 18. In this manner, when water flows into one of the inlets 20b, 22b and through the corresponding diffuser 23a, 23b the flowing water generally does not create global currents in the tank. Preferably, the diffusers 23a, 23b prevent mixing of the warmer water in the top portion 18a with the cooler water in the bottom portion 18b. Other diffuser designs may also be used. Some of these designs include octagonal diffusers which are formed by eight straight sections of pipe connected with 45° elbows. A series of equally sized, shaped, and spaced lateral slot openings are cut into the top of the straight sections of pipe in a manner similar to the slots cut in the diffuser shown in FIG. 3. Some diffusers have circular holes rather than slots. Other types of diffusers include radial disk diffusers which consist of two closely spaced disks, mounted parallel to the tank floor. In a radial disk diffuser, the incoming water flows between the disks and enters the tank horizontally.

Also shown in FIG. 3 is the thermocline 19, which is shown as a thin band. The thermocline 19 separates the cold water in the bottom portion 18b of the tank 18 from the warmer water in the top portion 18a. The bottom portion 18b of the tank 18 is that part of the tank 18 that is below the thermocline 19, and the top portion 18a of the tank 18 is that portion of the tank 18 that is above the thermocline 19. As mentioned, the thermocline will move up and down during the charge and discharge cycles respectively. The distance from the bottom 18d of the tank 18 to the thermocline 19 is denoted in FIG. 3 as H2. It is advantageous to position the bottom inlet 22b and the bottom outlet 22a at a height H1 that is below the thermocline 19 at its lowest point at the end of the discharge cycle. In so doing, generally the warmer water above the thermocline 19 should not be expelled out of the bottom outlet 22a to the air chiller 14 during the discharge cycle. In FIG. 3, the height of the bottom inlet 22b and the bottom outlet 22a are signified by H1, but it is to be understood that the bottom inlet 22b and the bottom outlet 22a may be at the same or different heights depending upon the requirements of the specific system. Preferably H2 is maintained at a height that is greater than H1, so that during the discharge cycle, the warmer water in the top portion 18a will not be expelled through the bottom outlet 22b. Generally, the tank 18 is sized, according to parameters described below, so that the height H2 of the thermocline may not fall below a height of less than about 10 feet. More preferably, the design tank size will be reduced such that the height H2 is less than about 5 feet, and most preferably, the tank size will be reduced to where height H2 is only about 18 inches during a complete discharge cycle on a design hot day.

During the discharge cycle, the heated water 16d from the air chiller 14 is introduced into the top portion 18a of the tank 18 through top inlet/outlet 20. This heated water 16d tends to remain above the chilled water 16b. At the level where the heated water meets the chilled water there may be a "thermocline," represented by line 19. A thermocline is a horizontal region that separates higher temperature water from lower temperature water. The bottom portion 18b of the tank 18 is below the thermocline 19 and the top portion 18a is above the thermocline. The bottom inlet/outlet 22 may be disposed at the very bottom 18d of the tank 18. However, the bottom inlet/outlet 22 may alternatively be positioned at any height so long as it is in the bottom portion 18b of the tank 18. Similarly, the top inlet/outlet 20 can be positioned at the very top 18c of the tank 18 but may also be positioned at any place in the top portion 18a of the tank 18. In one embodiment of the claimed invention, the top portion 18a contains water that is in the range of about 60° F. (about 16° C.) to about 70° F. (about 21° C.). In another embodiment, the temperature of the water in the bottom portion 18b is just above freezing temperature, which may vary depending upon atmospheric conditions (such as atmospheric pressure), or if chemicals are added to the water. Preferably, the water in the tank is pure water. However, the claimed invention contemplates the addition of various chemicals or other additives to the water to change the properties of the water mixture. Some chemicals, when added to water, tend to decrease the freezing temperature of water. Other chemicals tend to change the density of water. Still others may change the viscosity or heat capacity of the water. It may be desirable to add a chemical such as sodium nitrate to lower the freezing temperature of the water in the tank. This in turn may allow colder water to be delivered to the air chiller and can protect the system from freezing. Alternatively, for on-line systems which may be subjected to freezing ambient temperatures, the use of Potassium Formate is preferred instead of Ethylene Glycol or Propylene Glycol to protect the water from freezing. Potassium Formate maintains a lower viscosity than either of the glycols and thus gives better heat transfer at low temperatures. Potassium formate also has the added advantage of being more environmentally friendly than glycols. As used herein, the term "water" refers to pure water or an aqueous mixture including any additives.

The charge and discharge cycles will now be described with reference to FIG. 2A. The average temperature of the chilling water 16 in the tank 18 is preferably lowered or raised during separate cycles. During the water chilling or "charge" cycle, the average temperature of the water in the tank is lowered by introducing lower temperature chilling water 16a to the bottom of the tank 18b from the water chilling system 13. In an advantageous aspect of this invention, this charge cycle will typically be during the night-time or "off-peak" hours. At night, the ambient temperatures are generally lower, thereby largely eliminating the need to chill the inlet air 15a, 15b. Further, at night there is usually less demand for the power being produced by the power turbine. Therefore, at night, the water can be chilled using excess energy from the gas turbine system or power grid. Less electricity is required for primary power usage, and less expensive parasitic power is available for running the mechanical chiller 24. Also, more heat from the exhaust gas or steam may be available for running the absorption chiller 26 since less steam may be required by the steam turbine or cogeneration host during these "off-peak" night time hours. The charge cycle may, however, be performed at any time that proves advantageous to the particular operating conditions of the gas turbine system. Generally, the charge cycle should be performed when the need for useful power from the gas turbine system is at a minimum, i.e. off-peak periods, while the discharge cycle should be performed when the need for useful power is at a maximum, i.e. on-peak periods. As indicated above, after the charge cycle, the chilling water in the entire tank is preferably at a temperature of about 34° F. (about 1° C. to about 2° C.) to about 40° F. (about 4° C. to about 5° C.) unless additives are added to reduce the freezing point in which case even lower temperatures could be used. During the charge cycle, warm water 16e is pulled from the top 18a of the tank 18 and pumped through the water chilling system 13. Chilled water 16a is introduced back to the bottom portion 18b of the tank 18. The water level in the tank 18 does not change, only the proportion of warm water 16e to chilled water 16a changes as the tank becomes progressively chilled. Preferably, by the end of the charge cycle, the average temperature of the water in the tank is about 33° F. (about 0° C. to about 1° C.) to a range of from about 35° F. (about 1° C. to about 2° C.) to about 40° F. (about 4° C. to about 5° C.).

During the "discharge" cycle, all of the water chillers (e.g., chillers 24, 26) may be turned off, so that all the chilled water requirements for the air chilling coil 14 may be supplied by the tank 18. Advantageously, the discharge cycle occurs during peak power usage times (e.g., during the day), when parasitic power is most costly and/or an insufficient amount of waste heat from the exhaust gas 45 or steam may be available, e.g., to chill the water. As used herein, "daytime" refers to the period of time between sunrise and sunset. At this point, the storage tank 18 feature and the stored chilled water 16 in the tank 18 become particularly advantageous. Preferably, sufficient chilled water 16 is stored in the tank to last for the entire "discharge" cycle, with the option to have the water chilling system 13 supplement the stored chilled water 16 with directly chilled water as needed. Preferably, the amount of water discharged during the discharge cycle is less than the total volume of water stored in the tank 18. As before, chilling water 16b is removed from the bottom portion 18a of the tank 18, through bottom inlet/outlet 22. The chilling water 16b then passes on towards the air chiller 14. (An optional additional mechanical chiller 30 can be provided to further cool the chilled water 16b and introduce further chilled water 16c to the air chiller 14) The chilling water 16c then cools the inlet air in the air chiller 14 (e.g., a conventional air coiling coil), which produces higher temperature chilling water 16d. This higher temperature chilling water 16d is returned to the top portion 18a of tank 18. Because the higher temperature water 16d is being added to the tank 18, the average temperature of the water in the tank is increased (e.g., to a range of from about 60 (about 16° C.) ° F. to about 70° F. (about 21° C.)). However, by virtue of the temperature gradient within the tank, and the stratified nature of the water therein (as discussed above), the higher temperature water occupies the upper portion 18a of the tank 18, leaving the lower temperature water in the lower portion 18b of the tank 18, which is being discharged through outlet 22 to pass to the air chiller 14. Eventually, over time, the line (the thermocline) between higher and lower temperature water gets lower and lower in the tank, i.e., it approaches the bottom of the tank. Preferably, however, if the tank 18 is large enough, before that line reaches the outlet 22 of the tank 18, the "charge" cycle is initiated, whereupon the water chillers (24, 26) are activated, introducing new chilled chilling water 16a to the tank. That new lower temperature chilling water then begins to fill up the bottom portion 18a of the tank 18. In one embodiment, it may be preferable to initiate the charge cycle before the average temperature in the tank reaches about 36° F. (about 2° C. to about 3° C.).

As indicated in FIG. 2A, a number of different types of water chillers can be provided, at different locations, depending on design needs. For example, various mechanical chillers 24, 30 can be provided. Preferably, an upstream chiller is provided and whenever recovered GT exhaust heat is available, this upstream chiller is preferably an absorption chiller driven by either steam 44 from the HRSG 38 and/or steam from the back pressure steam 46 from the steam turbine 40 exhaust or hot water or steam 48 from an optional heat recovery coil 42. The use of absorption chillers to pre-chill the highest temperature water returning from the air cooling coil or tank is preferred, so long as a low grade heat source is available. This reduces the parasitic power required and improves the heat rate (efficiency) of the gas turbine by utilizing what would otherwise be "waste heat" energy. By combining the use of the chilled water storage tank 18 with absorption chillers, the amount of heat required can be made constant throughout a 24-hour day, even though the demand for chilled water may vary greatly between daytime and night-time. However, on most combined-cycle power plants where most of the gas turbine exhaust heat energy is already being used to provide steam to a steam turbine, the preferred upsteam chiller is a mechanical chiller because the efficiency of the mechanical chiller as measured by the coefficient of performance (COP=BTU of Refrigeration Duty/BTU of Energy required to drive the chiller) is much higher for the mechanical than the absorption chiller. The COP of a mechanical chiller is approx 6 to 7, while the COP of a single stage absorption chiller is about 0.6 and the COP of a two stage absorption chiller is about 1.0. Therefore by using this steam in the steam turbine to produce additional electrical energy and then using some of this electrical energy to drive a mechanical chiller is a more efficient chilling systems than using this steam in an absorption chiller.

Figure 2B:
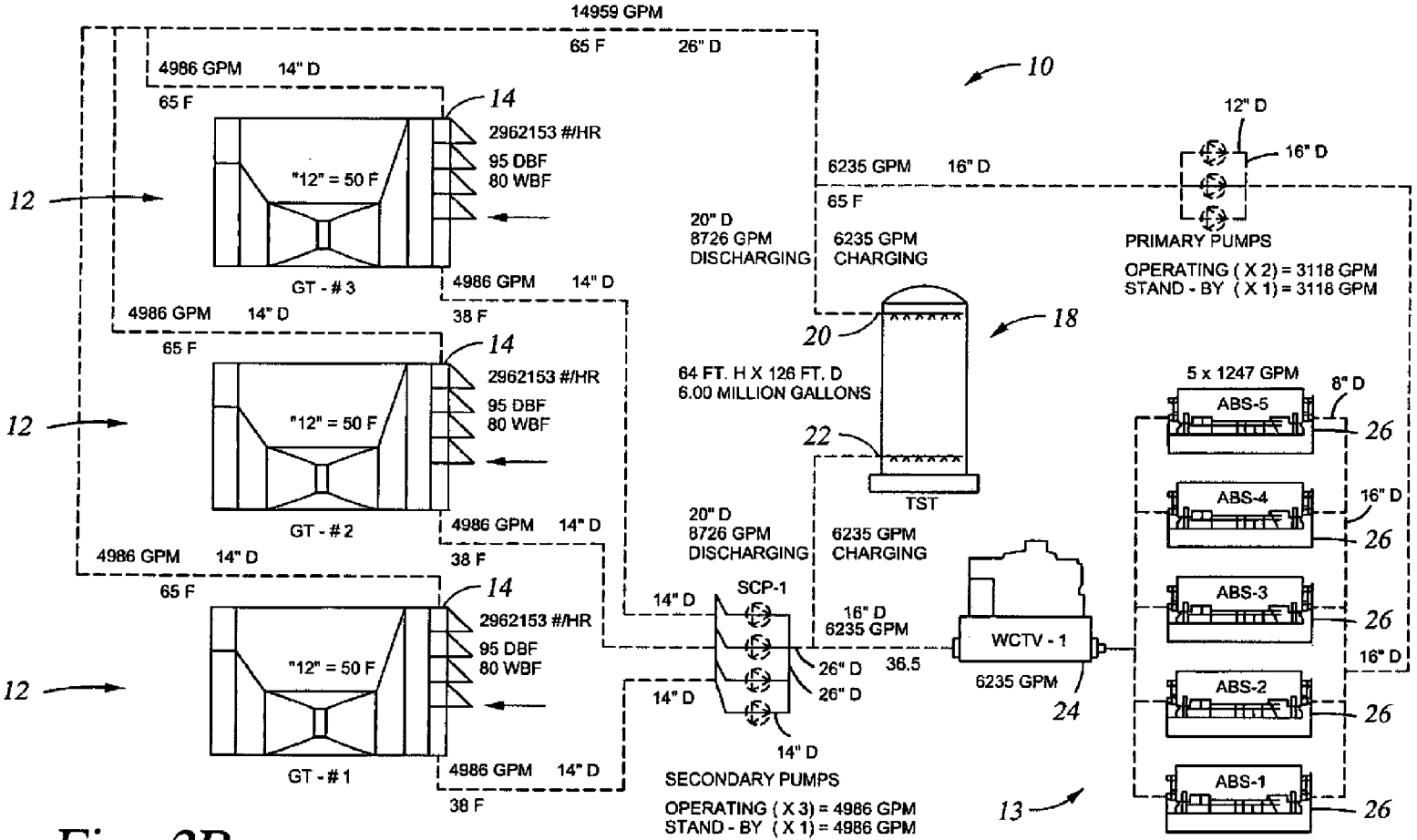

Now, with reference to FIG. 2B, a preferred embodiment of the method and apparatus of the present invention will be discussed. In this embodiment, multiple conventional gas turbine systems 12 are provided. Each gas turbine system 12 has an air chiller 14. One tank 18 is shown, however it may be desirable to use multiple tanks 18 depending upon the configuration of the plot space available. The inventor has found a preferred relationship between the amount of cooling required by the gas turbines and the volume of water that should be stored in the tank(s) 18. This relationship is as follows:

$$\frac{(P \times C)}{\Delta T} = \text{volume}$$

Where: P=the total amount of cooling required to reduce the temperature of the inlet air to the gas turbines 12, expressed in ton hours (each ton hour=12,000 BTU); ΔT=the difference in temperature of the water 16c and 16d across the air chiller 14, expressed in ° F.; C=a constant expressed in (° F.*gallons)/(ton*hours); and volume=the total volume of stored water required in gallons. The constant C is a number that is determined according to various required tank design parameters, such as the required height of the tank, the ΔT of the water and the diffuser design. Generally, C is in the range of about 1600 to about 1750; preferably C is in the range of about 1700 to about 1725; and in one specific embodiment, C was determined to be about 1720.

Depending upon the space requirements or soil conditions of any given installation, it may be preferable to employ several small tanks 18, or one larger tank 18. The design choice also depends upon the type of foundation chosen to hold the tank 18. Preferably, a ring-wall foundation is used, as shown in FIG. 3. In an embodiment with several tanks 18, each tank preferably has a bottom inlet/outlet 22 and a top inlet/outlet 20 and would preferably operate in much the same manner as previously described. Generally, tank volume requirements range from 800,000 gallons to 10 million gallons. Tank heights range from 25 feet to 70 feet, or to 90 feet. Tank diameters range from 50 feet to 250 feet. Normally, the tank diameter is greater than its height. Sometimes, it is preferred to have charge/discharge cycles that are relatively short in duration. For example, it may be more economical to employ a tank 18 that is only large enough to hold a volume of water for a discharge cycle lasting 4 or more hours. It also may be preferred to have a larger tank to hold a volume of water for an 8 or a 12 or more hour discharge cycle. Although generally for these longer peak periods the tank would supplement the chillers in a "partial storage" operation to maximize the available on-peak cooling hours with a given tank size. Generally, tank volumes range from 800 thousand gallons to 10 million gallons, but again, the volume of the tank is related to the ton-hours of cooling required to meet the desired entering air temperature of the power turbine which is a function of the ambient air enthalpy, the design chilled turbine inlet temperature, the airflow rate of the particular GT, the number of GT's, and the number of hours/day the storage system is to provide chilling.

B. Additional Methods and Systems

As discussed in the summary above, one or more embodiments of the invention include methods of chilling inlet air for a gas turbine power plant. The methods may include the use of features in addition to those shown in FIGS. 1-4. If a thermal storage tank is not used, the system will normally operate as an "on-line" system, meaning the chillers provide the chilling required by the coils and are operating at the time the coils use chilled water. One or more embodiments of the method include passing inlet air through a cooling coil, preferably a multi-pass cooling coil that includes at least four passes. The cooling coil should include an opening for receiving the inlet air and is preferably operably connected to a gas turbine power plant that includes at least one gas turbine, at least one compressor and at least one gas turbine inlet which receives the inlet air. The method may also include passing circulating water through one or more water chillers (which are preferably sequentially positioned) at a first flowrate to reduce the temperature of the circulating water, e.g., from a first temperature to a second temperature. Each water chiller should include at least one conduit, e.g., a piping or other tubular arrangement, through which the circulating water is capable of passing. The method preferably also includes passing the circulating water having the first flowrate, e.g., a relatively higher flowrate, through the cooling coil in an amount sufficient to lower the temperature of the inlet air to the desired temperature during high ambient (design conditions). Then, in a preferred embodiment of the invention, the method includes reducing the flowrate of the circulating water passing through the water chiller, e.g., to a reduced flowrate, e.g., a second flowrate during lower ambient (off-design conditions). Then, that preferred method should also include passing the circulating water through one or more water chillers (preferably the same water chillers corresponding to the first flowrate) at a different or "reduced" or "second" flowrate, in such a way and in an amount to increase the temperature difference (ΔT) between the circulating water entering the cooling coil and the circulating water leaving the cooling coil. The second flowrate should be lower than the first flowrate. Accordingly different predetermined flowrates for water passing through two or more chillers can be used. Then, the method should also include passing the circulating water having the second flowrate (or the reduced or different flowrate) through the cooling coil in an amount sufficient to lower the temperature of the inlet air. Preferably, the circulating water having a flowrate reduced as discussed above is passed through two or more sequentially positioned water chillers, and the circulating water is then directed through a multi-pass cooling coil. Preferably the circulating water having the first (e.g., higher) flowrate should be reduced to the second (lower flow rate) once the water ΔT (e.g., a temperature reduction by two or more sequentially positioned water chillers) is reduced to a pre-determined point due to a reduction in ambient load.

Figure 4A:
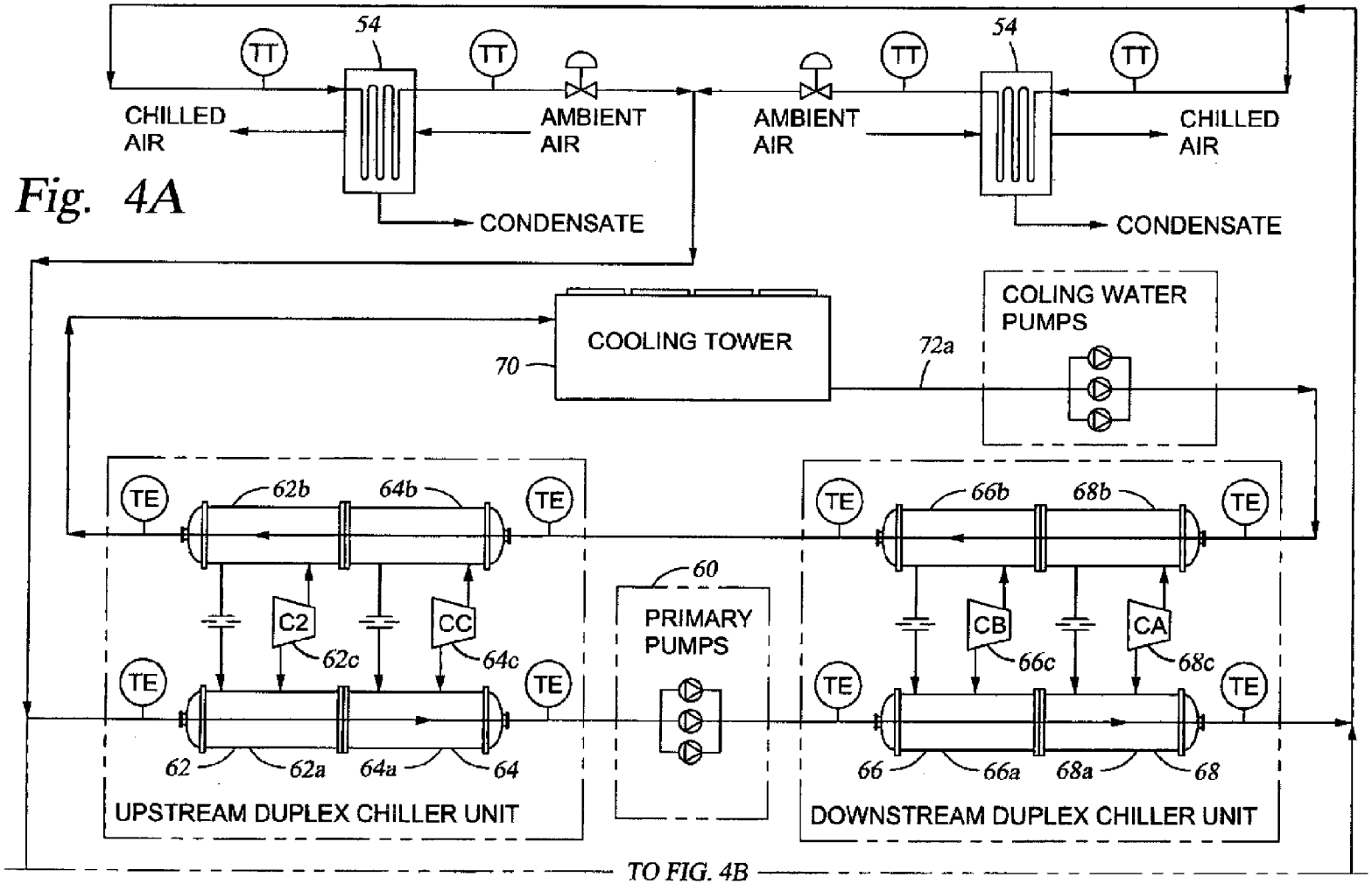
FIG. 4 is a schematic diagram of an alternative embodiment of a turbine inlet air cooling system showing sequential cooling of two in-series counterflow duplex chillers and multi-pass cooling coil.
Figure 4B:
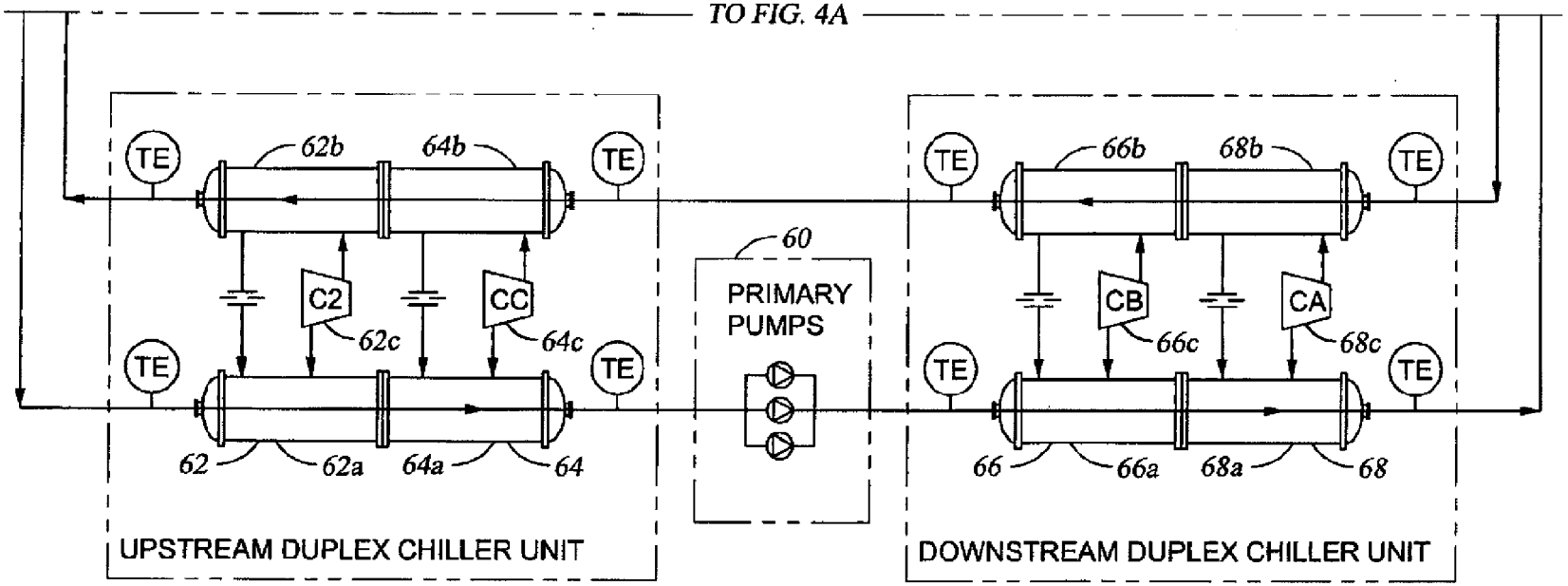

Alternatively, one or more embodiments of the invention include a method of chilling inlet air for a gas turbine power plant that includes one or more of the following aspects. In one or more embodiments, the method comprises passing inlet air through a cooling coil that is preferably a multipass cooling coil with four or more passes and that includes an opening for receiving inlet air and that is operably connected to a gas turbine power plant, i.e., directly or indirectly connected. That method may also include passing the inlet air (after being cooled) through at least one gas turbine inlet. That method preferably also includes passing circulating water through a water chiller (preferably two or more in-series chillers) to reduce the temperature of the circulating water (FIGS. 1 and 4). Each water chiller preferably includes at least one inlet for receiving circulating water, at least one conduit through which the circulating water is capable of passing, and at least one outlet for dispensing circulating water. The circulating water should be passed through two or more sequentially positioned compressors for sequentially chilling the circulating water. These compressors can be part of two different water chillers or part of a single duplex chiller. As used herein, a "duplex chiller" is a mechanical device with at least one inlet and at least one outlet where the temperature of water passing through the device is reduced two times via two different refrigerant temperatures and two separate compressions. Then, that preferred method should also include passing the circulating water through the cooling coil in an amount sufficient to lower the temperature of the inlet air, e.g., by making heat transfer contact between the circulating water and the inlet air. The "amount sufficient" is determined by specific system needs such as capacity, cooling coil feed air wet bulb temperature, and the desired leaving air temperature setpoint. In addition, the preferred method should include reducing the flowrate of the circulating water passing through the two or more sequentially positioned water chillers during reduced load ambient conditions. Also, the preferred method includes passing the circulating water having the reduced flowrate through the cooling coil in an amount sufficient to lower the temperature of the inlet air preferably by directly passing to a cooling coil, the water e.g., all or substantially all of the water, exiting the last (furthest downstream) water chiller prior to the cooling coil. Preferably, in most cases, the circulating water is not diverted or split as it passes between the water chillers and the cooling coil, e.g., by directing any portion (or more than 25% or 50%) of it to the water returning back to the chillers.

Another specific embodiment of the invention includes a method of chilling inlet air for a gas turbine power plant that includes one or more of the following aspects. For example, the method may include passing inlet air through a cooling coil. The method may also include passing circulating water through a water chiller to reduce the temperature of the circulating water. In addition, the method should also include passing the circulating water through the cooling coil to lower the temperature of the inlet air and to provide chilled inlet air to the gas turbine power plant. The method may additionally include supplying water to the chilled inlet air in an amount sufficient to increase the moisture content of the chilled inlet air, e.g., by adding water, e.g., liquid water or water vapor, to the inlet air after the inlet air has been treated partially or completely by the cooling coil, i.e., made at least partial heat transfer contact.

All references herein to "circulating water" refer broadly to any portion or all of the circulating water being used in the system, although in certain cases it will be apparent from the context that a reference to "circulating water" refers only to a selected portion of the circulating water in the system (e.g. when the temperature of a particular portion of circulating water is reduced, in which case the temperature of other portions of circulating water in other parts of the system may not necessarily be reduced). Preferably, the circulating water discussed herein travels in a complete "loop" as shown in FIG. 4, so that the same water is repeatedly cooled and heated.

Variable Flow and Low Flow. An important aspect of certain embodiments of the invention includes reducing the flowrate of circulating water in a particular way. All references to "flowrate" herein refer to the rate of circulating water passing through a particular portion in the system, e.g., the pump (e.g., in gpm), divided by a given amount of refrigeration duty (e.g., in tons). Preferably, optimizing the proper gpm/ton is an important design criteria. It is desirable to vary the chilled water flowrate to maintain a relatively low gpm/ton of approximately 0.3, 0.4, 0.5, 0.6, 07 or 0.8 to 1.6, 1.7, 1.8 or 1.9 gpm/ton at full load throughout the operating ambient range. The optimum design for on-line cooling systems will be from about 1.4 gpm/ton to about 1.0 gpm/ton. The optimum design for thermal storage systems will preferably be from 1.2 to 0.6 gpm/ton at full load. In addition it is desirable to vary the chilled water flowrate to maintain a relatively low gpm/ton of approximately 0.6 to 4 gpm/ton throughout the part-load operating ambient range or more preferably to maintain a flow of approx 0.8 to 2.5 gpm/ton. This will save significant pump power during the part load operation and it will also maintain a relatively warm return water temperature thus maintaining a high efficiency on the upstream compressors. More specifically, one or more embodiments of the invention include reducing the flowrate of circulating water passing through two or more sequentially positioned water chillers, preferably two duplex chillers (which provide four different temperature reductions), and passing the circulating water having the resulting reduced flowrate through a cooling coil in an amount sufficient to lower the temperature of the inlet air (FIG. 4). In other specific embodiments, a method of chilling inlet air includes passing circulating water, having a first temperature, through a pump, e.g., at a first flowrate, then passing that same water through a water chiller that reduces that circulating water temperature (e.g., using a first compression) so that the circulating water has a second temperature, which is lower than the first water temperature, and then passing that water through a second water chiller to reduce the circulating water temperature from a second temperature to a third temperature (e.g., using a second compression) that is lower than the second.

In a specific embodiment of the invention, the method includes reducing the circulating water flowrate in response to certain predetermined setpoints or events, i.e., criteria or benchmarks, e.g., in response to predetermined decreases in ambient air wet bulb temperature or enthalpy. As used herein, references to "ambient wet bulb temperature" refer to the wet bulb temperature of the air entering the cooling coil at the gas turbine power plant intake. Accordingly, ambient wet bulb temperature tends to constantly change at a given power plant location during the day and night, i.e., over a 24-hour period.

In a preferred embodiment, reducing the circulating water flowrate is based on a setpoint, which is discussed in further detail below. In a preferred embodiment where the chilled air temperature (e.g., compressor inlet air) is desired to be constant, the setpoint is a function of both ambient wet bulb temperature of the air and the temperature difference between the circulating water entering the cooling coil and the circulating water leaving the cooling coil (water ΔT). As the ambient wet bulb temperature decreases, the heat transferred to the circulating water from the inlet air also decreases. The water ΔT also decreases since the water ΔT is dependent upon heat transfer contact with the inlet air within the cooling coil. As the ambient temperature decreases, the temperature of the inlet air entering the cooling coil also decreases; therefore, the circulating water temperature can increase slightly and still maintain a desired leaving air temperature. The leaving air temperature remains constant because the load (Q) on the cooling coil decreases and thus the required log mean temperature difference (LMTD) between the air and the circulating water is reduced. As a result of the reduced ambient wet bulb temperature and thus the reduced load, the heat transfer between air and circulating water in the cooling coil decreases, resulting in a decreased water ΔT, as shown in the following equations:

$$(m\Delta h)_A=[(mCp)(T_0-T_1)]_w$$

$$Q=mCp\Delta T=m\Delta h$$

$$Q_{coil}=UA(LMTD);$$

As shown above, when the Δh of the air is reduced, the ΔT of the water is also reduced when the mass flowrate (m), the temperature of the air leaving the cooling coil ($T_{oa}$), and the heat transfer coefficient ($C_p$) remain nearly constant. The air leaving the cooling coil is typically saturated, i.e., the air has about a 100 percent relative humidity, therefore the wet bulb temperature and dry bulb temperatures of the leaving air are substantially the same.

In a preferred embodiment of the invention, a high system efficiency is achieved by maintaining a high water ΔT, rather than a high circulating water flowrate. Preferably, achieving a high system efficiency at a low circulating water flowrate (e.g., about 1 gpm/ton) depends, in part, on reducing the temperature of the circulating water at least two times before it chills the inlet air, i.e., sequential chilling. A preferred embodiment of the method includes using at least two water chillers to sequentially chill the circulating water.

As shown above, the traditional chilled water designs which utilize a high flowrate, e.g., from about 2 gpm/Ton to about 1.5 gpm/Ton circulating water flowrate at full load results in a lower circulating water ΔT (from 12° F. ΔT to 16° F. ΔT respectively) resulting in colder water (e.g., from about 52° F. to about 56° F. respectively) water returning to the upstream chiller. For example, the GE LM6000 is provided with a cooling coil that has been optimized for inlet cooling of their turbine. This coil is designed for a maximum design ambient case of 2200 tons of cooling using 3300 gpm of circulating chilled water flow. This equates to 1.5 gpm/ton or a 16° F. ΔT. This chilled water ΔT will get proportionately smaller as the ambient temperature drops below design because the flow rate (gpm) remains constant in conventional designs while the load (tons) is fluctuating with the ambient temperature. A preferred embodiment of the present invention includes reducing the circulating water flowrate to provide or maintain a higher water ΔT. It has been discovered that in the specific context described herein, reducing the circulating water flowrate reduces the amount of heat transfer through the cooling coil, i.e., heat transferring from the inlet air to the circulating water passing through the cooling coil. As shown in the above equations, a lower circulating water flowrate results in higher water ΔT when the inlet air flowrate and air Δh remain constant. As a result, the temperature of the circulating water leaving the cooling coil is higher at a lower flowrate than at a higher flowrate, thereby resulting in a high water ΔT. The use of sequential cooling via series chillers and/or multiple compressors allows high upstream compressor efficiency as a result of relatively warmer refrigerant temperatures. The warmer refrigerant temperatures are possible because the circulating water returning from the cooling coil is warmer. In addition, the power required to drive the circulating water pump will be lower since the power consumption required is proportional to the circulating water flowrate cubed.

In certain embodiments of the invention, the circulating water flowrate is reduced to maintain the chilled water ΔT within a specific design range. This ΔT should be maintained within a range of about 40° F. to 16° F. to maintain maximum efficiency with a sequential chilling system with the higher end of this range being better for thermal storage applications & high ambient climates. The lower end of this range is better for on-line applications with moderate ambient climates. In another specific embodiment, the leaving chilled water temperature setpoint and the circulating water flowrate setpoint may be changed to maintain the leaving air temperature and the chilled water ΔT within the design parameters. As used herein, the term "setpoint" refers to any predetermined point or event that results in the flowrate through the chillers and the coil being changed, or a change in the temperature of the water leaving the chiller. The setpoint may be or include a predetermined air Δh, or change in wet bulb temperature across the coil or the setpoint may be a predetermined ambient temperature or change in temperature or the setpoint may be a change in chilled water temperature. In addition, the setpoint may be derived from input parameters such as the chilled $H_2O$ flowrate and chilled $H_2O$ Δh. The setpoint may be changed depending on the time of the day or depending on system needs or the ambient temperature. As used in preferred embodiments herein, the "setpoint" is based upon maintaining a chilled water ΔT of at least 16° F. It is believed that the characteristics of a particular system are primarily determined by the wet bulb temperature of the ambient air and the leaving air temperature since this determines the load on the coil and also determines the temperature of the cooling tower water going to the chiller. As used herein, the term "wet bulb temperature" refers to the temperature measured by a thermometer with its bulb wrapped in wet muslin, although the wet bulb temperature may also be measured by any means known to those skilled in the art but most commonly is calculated electronically by simultaneously measuring dry bulb temperature and relative humidity. Preferably, the wet bulb temperature is electronically calculated by simultaneously measuring the dry bulb temperature and the relative humidity of the air. The wet bulb temperature is typically lower than the dry bulb temperature because the water on the bulb evaporates, resulting in cooling. Therefore, the difference between wet bulb temperature and dry bulb temperature depends on the humidity in the air. In carrying out certain specific embodiments of the method, the wet bulb temperature of the inlet air leaving the cooling coil is equal to its dry bulb temperature, in which case the air is considered to be "saturated" or 100% R.H.

In one or more specific embodiments of the invention, the circulating water is passed through at least one pump to vary the flowrate of the circulating water before it is subjected to sequential chilling, e.g., using two in-series chillers as shown in FIGS. 1 and 4. Alternatively or additionally, the circulating water may be passed through any number of pumps. Preferably the pumps are generally mounted in parallel to allow the flow to be changed by sequencing a combination of pumps on and off. Preferably, at least a portion of the circulating water is passed through one centrifugal pump, e.g., a horizontal split case pump, and a different portion of circulating water is diverted and passed through at least one additional pump the output streams of the two or more pumps then being combined. More preferably, the circulating water is split, then passed through two or more centrifigal pumps in parallel, then combined. Optionally, one or more of the pump motors may be wired to a Variable Frequency Drive for greater flexibility in flow control and greater partial load efficiency. The circulating water may be passed through a pump anywhere in the system. Preferably, however, as shown in FIG. 4, the circulating water is passed through at least one pump 60, referred to as a primary pump, located in the piping that circulates the chilled water through the chillers. Although the circulating water flowrate is preferably varied only at the primary pump, the circulating water may additionally or alternatively be passed through other pumps at any location in the system. When circulating water is passed through those other pumps, those pumps are typically not used to reduce the circulating water flowrate through the water chillers, but rather are used for another purpose, such as to pass water from a bank of chillers to the cooling coils.

In a preferred embodiment, the circulating water passes through at least one pump at full flow when the ambient wet bulb temperature is at a maximum (e.g., from about 72° F. to about 87° F.), typically at some point in time between noon and 3:00 pm during the summer season. As used herein, the term "full flow" refers to the maximum circulating water flowrate of the system. In this particular embodiment, when the ambient temperature drops (e.g., to a lower wet bulb period such as during the morning or afternoon) the water ΔT also drops. When the chilled water ΔT reaches a first setpoint (e.g., from about 75% to about 50% of design ΔT), one of the centrifugal pumps is preferably turned off. Shutting off one of the two operating centrifugal pumps should accordingly reduce the circulating water flow rate from about 100 percent flow to about 70 percent flow, thereby increasing the water ΔT, e.g., by about 43 percent. Then, when the circulating water reaches a second setpoint(e.g., from about 75% to about 50% of design ΔT), the VFD on the first VFD pump is reduced, further reducing the circulating water flowrate enough to maintain the chilled water ΔT to at least about 16° F.

Water Chilling. Another important aspect of one or more specific embodiments of the invention includes reducing the temperature of the circulating water from an initial temperature, e.g., a first temperature, to an intermediate temperature, e.g., a second temperature, that is lower than the initial temperature, e.g., first temperature, and then further reducing the circulating water from the intermediate, e.g., second, temperature, to a final temperature, e.g., a third temperature, that is lower than the intermediate temperature, e.g., second temperature. In the aforementioned method, the circulating water temperature may thus be reduced in stages by passing circulating water sequentially through two or more water chillers. An example is shown in FIG. 4, which shows circulating water passing from a cooling coil 54 to a first water chiller 62, then to a second water chiller 64, then through an optional third chiller 66 and fourth chiller 68, and then back to the cooling coil 54. As used herein, the term "water chiller" refers to an apparatus for lowering the circulating water temperature that includes at least a single compressor. Preferably the water chiller includes at least one opening for receiving the circulating water, at least one outlet for dispensing the circulating water. A conduit through which the circulating water is capable of passing should operably connect the one opening for receiving circulating water with the one outlet for dispensing circulating water. Preferably, the circulating water is passed through at least two water chillers, which can form part of a single "duplex chiller," although it could alternatively consist of two simplex chillers with the evaporators piped in series. Preferably, at least a portion of the circulating water is passed from and through the first water chiller to and through the second water chiller. More preferably, all, or substantially all, of the circulating water is passed from and through the first water chiller to the second water chiller.

Passing the circulating water through a water chiller, e.g., a conventional mechanical or absorption chiller, reduces the circulating water temperature. When the circulating water is sequentially passed through two water chillers whose evaporators are piped in series (or through a single duplex chiller), the circulating water temperature is reduced twice. Preferably, in carrying out certain methods of the invention, the sequential circulating water temperature reductions are accomplished by passing the circulating water through a duplex chiller such as the Trane duplex centrifugal CDHF water chiller. As shown in FIG. 4, staged or step-wise circulating water temperature reductions can be accomplished by passing circulating water 58 through an evaporator 62a within the duplex chiller CH2. The evaporator chills the circulating water by receiving a refrigerant such as ammonia, R-22, R-134a, or R-123 available from Dupont. Preferably, R-123 or a similar refrigerant is passed from a condenser 62b to the evaporator 62a to chill the incoming circulating water. The refrigerant is then passed from the evaporator 62a back through a compressor 62c to the condenser 62b for condensing the vaporized refrigerant back to a liquid. The refrigerant is cooled and condensed by condenser water 72a passed from a cooling tower 70 to the condenser 62b (typical of one chiller).

A specific embodiment of the invention includes passing circulating water through a duplex chiller to reduce its temperature from a first temperature to a second temperature lower than the first, then to a third temperature lower than the second (FIG. 4). The circulating water can then be passed through another duplex chiller to further reduce the water temperature twice. Any number of water chillers may be included to reduce the temperature of circulating water for large tonnage applications on large gas turbines (above 60 MW) in a greater number of sequential steps although two duplex chillers in series (4 stages of cooling) is considered the optimum. For larger gas turbine installations that would require more capacity than can be accomplished with 2 duplex chillers, additional pairs of duplex chillers can be provided that divide the total flow of water into the parallel trains of chillers (similar to the 2 parallel trains shown in FIG. 4).

The discussion of the embodiments has focused primarily on the sequential chilling of the chilled water by using progressively colder evaporator refrigerant temperatures. However, there is also increased efficiency available by utilizing sequential heat rejection from the refrigerant to the condenser water through two or more condensers in series. It is preferred that the condenser water be piped in a counterflow arrangement to that of the chilled water, i.e., the coldest condenser water is adjacent to the coldest circulating water.

Sequential chilling of the circulating water in the evaporator, which results in sequential vaporization of the refrigerant, can be combined with sequential heating of the cooling tower water, which results in sequential condensing of the refrigerant, thereby equalizing the head on each compressor, e.g., by passing all, substantially all, or at least a portion, of circulating water from a first water chiller to a second water. Equalizing the head on each compressor can increase the compressor efficiency, shown in greater detail below. As used herein, the term "head" refers to the compressor pressure ratio, which is the pressure of the condenser divided by the pressure of the corresponding evaporator. For example, referring to FIG. 4, the upstream compressor 62c head is equal to the pressure of the upstream condenser 62b divided by the pressure of the corresponding Evaporator 62a.

In a preferred embodiment of the invention, the circulating water is passed from a cooling coil through two duplex chillers (CH 2 & CH 4), sequentially. The circulating water passing through the duplex chillers is reduced from a high temperature resulting from a high water ΔT through the cooling coil (from about 55° F. to about 70° F.) to a final temperature of from about 34° F. to about 44° F., that is the coldest in the system. Example data in such a system is shown in Tables 1 and 2 and FIG. 7.

TABLE 2

Temperature Profile through Water Chillers at 6600 gpm (full flow) & Full Load (75 F. Ambient Wet Bulb Temp) chilled to 50 F. T2 Air Temp

| | Circulating Water Inlet Temperature (° F.) $58_b$ | Circulating Water Outlet Temperature (° F.) $58_a$ |
|---|---|---|
| First Water Chiller 62 | 61.5 F. | 55.6 F. |
| Second Water Chiller 64 | 55.6 F. | 50.5 F. |

TABLE 2-continued

| Temperature Profile through Water Chillers at 6600 gpm (full flow) & Full Load (75 F. Ambient Wet Bulb Temp) chilled to 50 F. T2 Air Temp | | |
|---|---|---|
| | Circulating Water Inlet Temperature (° F.) $58_b$ | Circulating Water Outlet Temperature (° F.) $58_a$ |
| Third Water Chiller 66 | 50.5 F. | 45.6 |
| Fourth Water Chiller 68 | 45.6 | 41.4 |

TABLE 2

| Temperature Profile through Water Chillers at 4620 gpm (70% of fall flow) & Part Load (70 F. Ambient Wet Bulb Temp) & 50 F. T2 Temp | | |
|---|---|---|
| | Circulating Water Inlet Temperature (° F.) $58_b$ | Circulating Water Outlet Temperature (° F.) $58_a$ |
| First Water Chiller 62 | 62 F. | 55.5 F. |
| Second Water Chiller 64 | 55.5 F. | 50.0 F. |
| Third Water Chiller 66 | 50.0 F. | 44.6 F. |
| Fourth Water Chiller 68 | 44.6 F. | 40 F. |

One benefit of sequentially chilling the circulating water is that only the downstream compressor 68c needs to compress the refrigerant to a low enough pressure to chill the circulating water to the lower leaving chilled water temperature which is required with a lower circulating water flowrate (FIG. 4).

When the circulating water flowrate is reduced, the power consumption of the downstream compressor may increase. The compressor power consumption increases as a result of chilling the refrigerant to a lower temperature due to the lower leaving water temperature than that required at a high circulating water flowrate. The circulating water entering the downstream evaporator is at a higher temperature than when circulating water is at full flow because the coil will heat up the circulating water more at lower flow. Therefore, at a reduced flowrate, the downstream refrigerant must be at a lower temperature to maintain the required LMTD and heat transfer required at the cooling coil.

An alternative, when water is unavailable for use in a water-cooled condenser, an air-cooled condenser may be used to reject the heat from the refrigerant to the ambient air An air-cooled condenser typically cannot be used to sequentially reject heat to the ambient like that of series piped water-cooled condensers, but it will still provide an increase in the upstream compressor efficiency as a result of sequentially chilling the circulating water using staged evaporators to allow sequentially lower refrigerant temperatures with the different compressors. A preferred embodiment of this invention is to combine sequential chilling of the circulating water with a chilled water thermal storage tank as discussed earlier. This is especially beneficial when no water is available due to the great variability in the dry bulb temperature between daytime and nighttime. The lower nighttime dry-bulb temperature will significantly increase the capacity and the efficiency of the chillers to generate chilled water off-peak and minimize the daytime on-peak parasitic power required.

Air Chilling. Another important aspect of the invention includes reducing the temperature of the inlet air, which may include passing circulating water through a cooling coil in an amount sufficient to reduce the temperature of the inlet air. The reduction in inlet air temperature increases the density of the air, allowing a higher mass flow rate through the compressor of the gas turbine power plant. Therefore, a higher mass flowrate allows the gas turbine power plant to produce more electricity.

Figure 5:
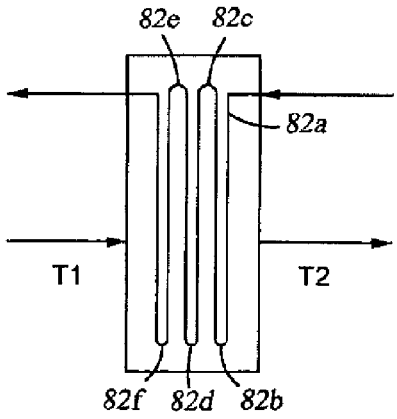
FIG. 5 is a schematic diagram of a 6 pass cooling coil useful in very high delta T thermal storage embodiments of the present invention.

In specific embodiments of the invention, the circulating water makes more than one pass through the cooling coil. Most preferably, the circulating water makes four or more passes through the cooling coil. In a specific embodiment shown in FIG. 5, the circulating water is passed through the cooling coil 54 six times which is the preferred method if a thermal storage tank in used with a high ambient climate. As used herein, the term "pass through the cooling coil" refers to each time that the circulating water changes directions inside the cooling coil. Passing circulating water through the cooling coil four to six times achieves a very high water ΔT (from about 20° F. to about 40° F.). In addition, four or six passes achieves good heat transfer at low water flow rates between the circulating water and the inlet air due to the turbulence of the water in the tubes. On each pass, the temperature of the circulating water is increased. For example, on the first pass 82a, the circulating water temperature may increase from about 39° F. to about 44° F. The circulating water temperature may increase from about 65° F. to about 74° F. on the final pass, 82f. Example data in such a system is shown in Table 3.

TABLE 3

| Temperature Profile through cooling coil at 0.69 gpm/Ton | | |
|---|---|---|
| | Circulating Water Temperature entering pass (° F.) | Circulating Water Temperature leaving pass (° F.) |
| First Pass 82a | 39.00 | 44.04 |
| Second Pass 82b | 44.04 | 48.94 |
| Third Pass 82c | 48.94 | 53.53 |
| Fourth Pass 82d | 53.53 | 58.72 |
| Fifth Pass 82e | 58.72 | 65.40 |
| Sixth Pass 82f | 65.40 | 74.00 |

Passing inlet air through a cooling coil including multiple circulating water passes provides a significant reduction in the inlet air temperature (from about 80 to 125° F. to about 43 to 60° F.). The inlet air may be passed through any number of cooling coils as required to provide enough face area to keep the air velocity through the coil at between 400 to 650 ft/min. Preferably, the inlet air is passed through a single coil in the direction of airflow to the gas turbine power plant but it may also flow through a second coil if required to get the high delta T desired. More preferably, the circulating water is passed through only one cooling coil in the direction of airflow with multiple coils placed above or on the side as needed to provide sufficient face area.

Water Addition. In another embodiment of the invention, water may be added to the inlet air after it has been chilled at least to some extent. Preferably, water is added to the compressor feed air, which is the inlet air after it passes through and exits the cooling coil, i.e., no longer contacts the coil, and before the inlet air enters, i.e., first contacts, the turbine power plant compressor. Such compressor feed air is typically the coldest inlet air in the system. Preferably, the water is added in the form of finely atomized water droplets or mist. Adding water to the compressor feed air provides (supplies) entrained water to the inlet air. As used herein, the term "entrained water" refers to water trapped within the air that does not evaporate. The water in the inlet air does not evaporate when the cooled inlet air, e.g., the condenser feed air, is already fully saturated, i.e., at "saturation," as a result of being chilled by passing through the cooling coil. Entraining water in the compressor feed air provides cooling in the interstages of the compressor within the gas turbine power plant. The compressor intercooling occurs as the inlet air passes through the compressor. As the inlet air passes through the compressor and is compressed, the inlet air is heated, thereby vaporizing the entrained water. The heat absorbed by the vaporization of the liquid mist into water vapor cools the air in the compressor. Intercooling of the compressor can increase the compressor efficiency and may improve the power output by approx 140 KW per gallon of water added per minute. Thus, any of the methods described herein for cooling inlet air may advantageously further include the addition of water as described above.

Although the water may be added to the chilled inlet air from any source, e.g., from a vessel such as the storage tank, water is preferably added from the cooling coil condensate 70, as shown in FIG. 4. As used herein, the term "cooling coil condensate" refers to water condensed out of the inlet air, e.g., the air stream passing through the cooling coil. Adding cooling coil condensate, rather than water from another source, utilizes water that is already available. The water may be added to the inlet air at any location. Preferably, the water is added before the inlet air enters the gas turbine power plant 76 but after it leaves the cooling coil 54. Alternatively, this water may be stored and used when the chilling system is off but the gas turbine is still operating by providing an evaporative cooling effect.

Heating. In another embodiment of the invention, the circulating water is passed from the cooling coil 54 to the heater 84 and back to the cooling coil, as shown in FIG. 4. For example, the circulating water can be passed to the heater on cold days (e.g., when the ambient temperature is below about 10° F.). The circulating water is heated from about 10° F. to about 20° F. to prevent icing of the turbine within the gas turbine power plant. This may be particularly useful on certain aeroderivative gas turbines such as the LM6000. Any heater may be included, e.g., gas fired or electric water heater of steam or hot water exchanger. Passing the circulating water through a heater may increase the efficiency of some gas turbines during very cold periods (when ambient temperature is below about 30° F.). For example, some turbines have a limit on the amount of mass flow they can accept due to their compressor design such as some of the Westinghouse 501F models. During very cold ambients these turbines must use Inlet Guide Vane control or other means to limit the mass flow of air into the compressor. Since this tends to be a less efficient operating point, it would be advantageous to warm the air to reduce the density of the air and thus keep the engine within a desirable mass flow range.

Circulating Water Additives. Any of the methods described herein may include adding one or more additives to the circulating water to either protect the circulating water from freezing or to allow colder circulating water supply temperatures (from about 28° F. to about 35° F.). Any additive may be added, including glycol. Preferably, an organic or inorganic salt is added. More preferably, sodium nitrate is added to prevent the detrimental effects of glycol on the heat transfer properties and viscosity of water, which tend to increase the power requirements for pumping and for the chiller compressor. In addition, sodium nitrate is not corrosive like other salts. Sodium nitrate would be the most preferable additive if a chilled water thermal storage tank were used due to its low cost. However for on-line systems where no thermal storage tank is used, the most preferable additive is potassium formate. The ability of potassium formate to protect the coil and piping from freezing during winter ambients, combined with its excellent heat transfer properties and low viscosity at low temperatures makes this an ideal additive for closed loop chilled water systems in Turbine Inlet Cooling applications.

Packaging. The chilling system may be installed by any method, but preferably, the system is mounted on a prepackaged factory built skid. The entire skid is enclosed, climate controlled and equipped with an overhead monorail crane to facilitate maintenance.

In addition, the skid package would optionally include all of the motor starters for the chillers and pumps. An optional heat rejection system may also be provided which would include one or more cooling water pumps to circulate water from a cooling tower through the condenser tubes of the chiller and then carry the heated water back to the cooling tower, if water is available. A packaged cooling tower may optionally be provided as part of the system and would preferably be mounted above the skid to minimize footprint and provide sufficient net positive suction head to the circulating water pumps mounted on the skid to prevent any cavitation with the pumps. Alternatively, for sites with water restrictions, an optional air-cooled condenser may be provided and would preferably be mounted above or along side the skid. Additionally an optional variable frequency drive may be mounted on the skid to modulate the flow of water through the evaporator of the chillers, which would result in lower energy consumption during reduced ambient periods. This optional VFD may also be applied to the cooling tower fans and the cooling water pumps. The skid may include one or more water chillers, one or more chilled water pumps capable of varying the flow of circulating water through the evaporator tubes of the chillers, and a controls system to optimize and control the proper amount of chilled water flow and temperature to minimize the total amount of electricity required to power the inlet chilling system. The skid may incorporate a microprocessor or PLC based controls system responding to temperature sensors and flow measurement. This system may communicate with the power plant's control system. The skid control's system could enable the turbine operator to monitor remote sites from a single location via modem or internet communication.

Figure 6:
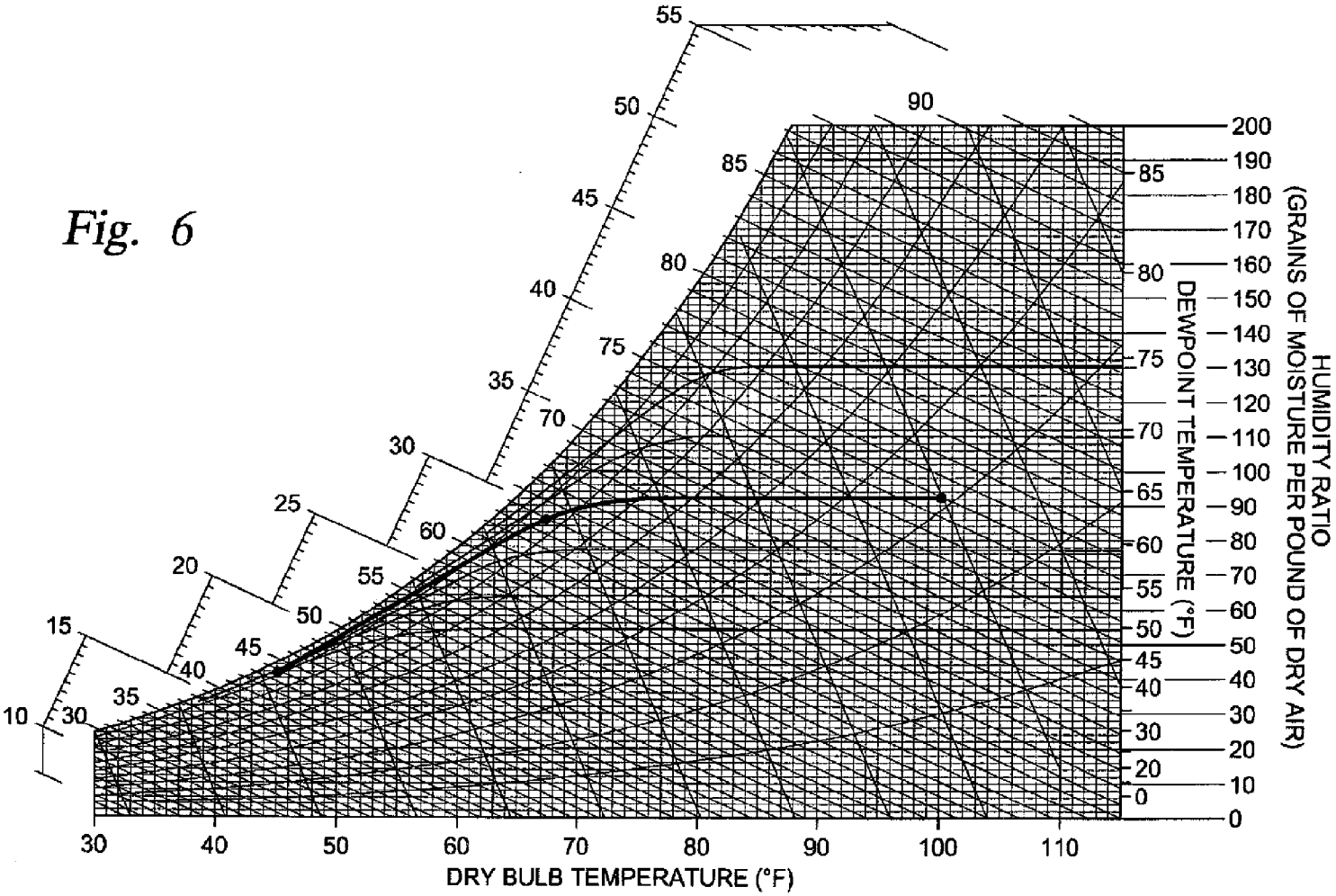
FIG. 6 is a psychrometric chart showing the various operating points of a cooling coil when operating in an optimal capacity mode or an optimal combined cycle efficiency mode of operation.

Optimized Efficiency Control vs Optimized Capacity Control. Normally the controls of the Turbine Inlet Cooling system will be designed to provide a constant inlet air temperature to the compressor of the gas turbine to maintain its capacity during high ambient periods. This compressor inlet air temperature (normally called "T2") is typically maintained at a setpoint of approximately 45° F. or 50° F. to maintain the gas turbine manufacturers minimum temperature to prevent icing in the bellmouth of the turbine. For simple cycle gas turbines (i.e, no steam turbine) this lower T2 air temperature also results in greater gas turbine efficiency (defined at BTU/KWH) as well as increased capacity (defined as KW or MW). However, for combined cycle plants, it has been found through modeling the plant operations with computer simulation software, that the overall heat rate (efficiency) of the plant goes down slightly when reducing T2 utilizing Turbine Inlet Cooling even though the capacity output is significantly increased. This is because the colder inlet air to the gas turbine increases the mass flow and results in lower temperature exhaust and thus lower steam pressure at the Heat Recovery Steam Generator (HRSG). This results in a lower percentage increase of steam turbine output vs the gas turbine output when compared to the same plant at higher entering air temperature. This fact combined with the parasitic power required to drive the mechanical chilling system will usually result in a slight decrease in overall combined cycle efficiency. This efficiency degradation can be mitigated through the use of a special control algorithm whereby the inlet air dry bulb temperature and relative humidity are precisely measured and the dew point calculated. By controlling the leaving air temperature off the cooling coil to maintain a temperature slightly above the dew point temperature, the coil can be prevented from producing condensate which will greatly reduce the parasitic power associated with the mechanical inlet chilling system. An alternative method that accomplishes the same thing would employ an accurate relative humidity sensor downstream of the coil and limit the leaving air temperature to where the RH is maintained at about 95-99% and not allowed to become fully saturated whereby moisture would be condensed on the coil (see FIG. 6 Psychrometric Chart). This reduced parasitic power will allow the overall combined cycle plant to maintain its original high net efficiency and still get much of the capacity improvement associated with inlet cooling. This method of control will normally only be employed when the economics of operating the power plant favor maximum efficiency over maximum capacity.

What is claimed is:

1. A method of chilling inlet air to a combined cycle gas turbine plant, comprising:

a. a gas turbine that includes a gas turbine inlet and a steam turbine;

b. providing a system of circulating liquid chilling water including a chilling system that includes a first chiller;

c. passing at least a portion of the liquid chilling water through the first chiller, the liquid chilling water passing through the first chiller being lowered to a first temperature;

d. providing an inlet air chiller, comprising a cooling coil through which liquid chilling water passes, for lowering the temperature of inlet air being fed to the gas turbine compressor through heat transfer between the liquid chilling water passing through the cooling coil and the inlet air, wherein the inlet air chiller provides a liquid chilling water temperature rise;

e. chilling the inlet air by directing the liquid chilling water through the cooling coil of the inlet air chiller to make heat transfer contact between the liquid chilling water and the inlet air; and f. controlling the leaving air temperature off the cooling coil to maintain a leaving air temperature slightly above the dew point temperature of the ambient air to maintain high efficiency on the power plant.

2. The method of claim 1, wherein an amount of circulating chilled water flow rate is varied to the cooling coil to maintain a leaving air temperature slightly above the dew point temperature of the ambient air.

3. The method of claim 1, wherein the temperature of the circulating chilled water is varied to the cooling coil to maintain a leaving air temperature slightly above the dew point temperature of the ambient air.

4. The method of claim 1, wherein a circulating chilled water flow rate or the circulating chilled water temperature is varied to the cooling coil to maintain a relative humidity off the coil to below about 95% to about 99% RH.

5. A method of chilling inlet air to a gas turbine, comprising:

a. a gas turbine that includes a gas turbine inlet;

b. providing a system of circulating liquid chilling water solution wherein the water solution contains water plus an additive which is capable of reducing the freezing point of water;

c. passing at least a portion of the liquid chilling water solution through a first chiller and then a second chiller, the liquid chilling water solution passing through the first chiller being lowered to a first temperature; and the liquid chilling water solution passing through the second chiller being lowered to a second temperature which is lower than the first;

d. providing an inlet air chiller, comprising a cooling coil through which the liquid chilling water solution passes, for lowering the temperature of inlet air being fed to the gas turbine compressor through heat transfer between the liquid chilling water solution passing through the cooling coil and the inlet air, and e. chilling the inlet air by directing the liquid chilling water solution through the cooling coil of the inlet air chiller to make heat transfer contact between the liquid chilling water and the inlet air.

6. The method of claim 5, wherein the chilling water solution comprises an additive of sodium nitrate in an amount sufficient to decrease the freezing temperature of the chilling water solution.

7. The method of claim 5, wherein the chilling water solution comprises an additive of potassium formate in an amount sufficient to decrease the freezing temperature of the chilling water solution.

*8. A system for chilling inlet air to a gas turbine plant, comprising:*

*a. a gas turbine that includes a gas turbine air inlet;*

*b. an air cooler disposed adjacent the gas turbine air inlet, the air cooler having an air inlet, an air outlet, a liquid water inlet and a liquid water outlet;*

*c. a thermal energy storage tank having a warm water port and a cool water port and a water reservoir defined within the tank, the reservoir having an upper first portion and a lower second portion, wherein the warm water port is in fluid communication with the first portion of the reservoir and the cool water port is in fluid communication with the second portion of reservoir;*

*d. a first water circulation system comprising a first chiller and a first pump system, the first chiller having a first chiller inlet and outlet, wherein the outlet of the first chiller is in fluid communication with the cool water port, and the inlet of the first chiller is in fluid communication with the warm water port of the thermal energy storage tank, the first pump system having a first pump inlet and first pump outlet, wherein the first pump system is in fluid communication with the first chiller,*

*e. wherein the first pump inlet is in fluid communication with the second portion of the reservoir and the liquid water outlet of the air cooler is in fluid communication with the first portion of the reservoir, and*

*f. a second water circulation system comprising a variable speed pump system having a variable speed pump, wherein variable speed pump system is in fluid communication with the second portion of the reservoir and the liquid water inlet of the air cooler.*

*9. The system of claim 8, wherein the first and second water circulation systems comprise water disposed therein, wherein the water in the first water circulation system has a first temperature at the inlet of the first chiller and a second temperature, cooler than the first temperature, at the outlet to the first chiller.*

*10. The system of claim 9, further comprising an additive disposed in the water within the first and second water circulation systems, wherein the additive is capable of reducing the freezing point of water.*

*11. The system of claim 8, wherein the first water circulation system further comprises a second chiller arranged in parallel with the first chiller.*

*12. The system of claim 8, wherein the first water circulation system further comprises a second chiller arranged in series with the first chiller.*

*13. The system of claim 8, wherein the first chiller is a duplex chiller.*

*14. The system of claim 8, wherein the variable speed pump system comprises at least two variable speed pumps in parallel.*

*15. The system of claim 8, further comprising a sensor system having at least one sensor adjacent the air outlet of the air cooler and a control system disposed to alter a characteristic of the second water circulation system based on the sensor system.*

*16. The system of claim 15, wherein the sensor comprises a temperature sensor.*

*17. The system of claim 15, wherein the sensor comprises a relative humidity sensor.*

*18. The system of claim 15, wherein the sensor system comprises a relative humidity sensor and a temperature sensor.*

*19. The system of claim 15, wherein the control system is disposed to alter the temperature of water in the second water circulation system based on the sensor system.*

*20. The system of claim 15, wherein the control system is disposed to alter the flow rate of water within the second water circulation system based on the sensor system.*

*21. A system for chilling inlet air to a gas turbine plant, comprising:*

*a. a gas turbine that includes a gas turbine air inlet;*

*b. an air cooler disposed adjacent the gas turbine air inlet, the air cooler having an air inlet, an air outlet, a liquid water inlet and a liquid water outlet;*

*c. a thermal energy storage tank having a warm water port and a cool water port and a water reservoir defined within the tank, the reservoir having an upper first portion and a lower second portion, wherein the warm water port is in fluid communication with the first portion of the reservoir and the cool water port is in fluid communication with the second portion of reservoir; and*

*d. a first water circulation system comprising a first chiller having a first chiller inlet and outlet and a second chiller having a second chiller inlet and outlet, wherein the outlet of the first chiller is in fluid communication the inlet of the second chiller such that the first and second chillers are arranged in series, the outlet of the second chiller is in fluid communication with the cool water port, and the inlet of the first chiller is in fluid communication with the warm water port of the thermal energy storage tank,*

*e. wherein the liquid water inlet of the air cooler is in fluid communication with the second portion of the reservoir and the liquid water outlet of the air cooler is in fluid communication with the first portion of the reservoir.*

*22. The system of claim 21, wherein the first water circulation system comprises water disposed therein, wherein the water has a first temperature at the inlet of the first chiller and a second temperature, cooler than the first temperature, at the inlet to the second chiller and the water has a third temperature at the second chiller outlet that is cooler than the second temperature.*

*23. The system of claim 22, further comprising an additive disposed in the water within the first water circulation system, wherein the additive is capable of reducing the freezing point of water.*

*24. The system of claim 21, further comprising a second water circulation system, the second water circulation system comprising a variable flow pump system, the variable flow pump system having a pump inlet and pump outlet, wherein the pump outlet is in fluid communication with the liquid water inlet of the air cooler.*

*25. The system of claim 24, wherein the variable flow pump system comprises a variable speed pump.*

*26. The system of claim 24, wherein the variable flow pump system comprises at least two variable speed pumps in parallel.*

*27. The system of claim 21, wherein the first and second chillers together comprise a single duplex chiller.*

*28. The system of claim 21, further comprising a sensor system having at least one sensor adjacent the air outlet of the air cooler and a control system disposed to alter a characteristic of the water in the water circulation system based on the sensor system.*

*29. The system of claim 28, wherein the sensor comprises a temperature sensor.*

*30. The system of claim 28, wherein the sensor comprises a relative humidity sensor.*

*31. The system of claim 28, wherein the sensor system comprises a relative humidity sensor and a temperature sensor.*

*32. The system of claim 28, wherein the control system is disposed to alter the temperature of water in the water circulation system based on the sensor system.*

*33. The system of claim 28, wherein the control system is disposed to alter the flow rate of water within the water circulation system based on the sensor system.*

*34. A system for chilling inlet air to a gas turbine plant, comprising:*

*a. a gas turbine that includes a gas turbine air inlet;*

*b. an air cooler disposed adjacent the gas turbine air inlet, the air cooler having an air inlet, an air outlet, a liquid water inlet and a liquid water outlet; and*

*c. a chilled water circulation system comprising a first duplex chiller and a second duplex chiller, each of the duplex chillers having an inlet and outlet, wherein the outlet of the first duplex chiller is in fluid communication with the water inlet of the second duplex chiller, the outlet of the second duplex chiller is in fluid communication with the air cooler, and the inlet of the first duplex chiller is in fluid communication with the water outlet of the air cooler.*

*35. The system of claim 34, the chilled water circulation system further comprising water disposed therein, wherein the water in the chilled water circulation system has a first temperature at the inlet of the first duplex chiller and a second temperature cooler than the first temperature at the first duplex chiller outlet.*

*36. The system of claim 35, further comprising an additive disposed in the water within the water circulation system, wherein the additive is capable of reducing the freezing point of water.*

*37. The system of claim 34, wherein at least one of the duplex chillers comprises a first chiller and a second chiller.*

*38. The system of claim 34, further comprising a condenser water circuit, wherein each of the first and second duplex chillers has a condenser water inlet and outlet, wherein the condenser water inlet of the first duplex chiller is in fluid communication with the condenser water outlet of the second duplex chiller, whereby water flow through the condenser water circuit is in a direction opposite of chilled water flow through the first chiller inlet and outlet.*

*39. The system of claim 34, further comprising a variable flow pump system, the variable flow pump system having a*

*pump inlet and pump outlet, wherein the pump outlet is in fluid communication with the liquid water inlet of the air cooler.*

*40. The system of claim 39, wherein the variable flow pump system comprises a variable speed pump.*

*41. The system of claim 39, wherein the variable flow pump system comprises at least two variable speed pumps in parallel.*

*42. The system of claim 34, further comprising a sensor system having at least one sensor adjacent the air outlet of the air cooler and a control system disposed to alter a characteristic of the water in the water circulation system based on the sensor system.*

*43. The system of claim 42, wherein the sensor comprises a temperature sensor.*

*44. The system of claim 42, wherein the sensor comprises a relative humidity sensor.*

*45. The system of claim 42, wherein the sensor system comprises a relative humidity sensor and a temperature sensor.*

*46. The system of claim 42, wherein the control system is disposed to alter the temperature of water in the water circulation system based on the sensor system.*

*47. The system of claim 42, wherein the control system is disposed to alter the flow rate of water within the water circulation system based on the sensor system.*

*48. The system of claim 47, further comprising a variable speed pump.*

*49. The system of claim 47, further comprising at least two variable speed pumps in parallel.*

*50. A system for chilling inlet air to a gas turbine plant, comprising:*

*a. a gas turbine that includes a gas turbine air inlet;*

*b. an air cooler disposed adjacent the gas turbine air inlet, the air cooler having an air inlet, an air outlet, a liquid water inlet and a liquid water outlet; and*

*c. a water circulation system having water disposed therein, the water circulation system comprising a first chiller having a first chiller inlet and outlet, a second chiller having a second chiller inlet and outlet, a third chiller having a third chiller inlet and outlet, wherein the outlet of the first chiller is in fluid communication the inlet of the second chiller and the outlet of the second chiller is in fluid communication with the inlet of the third chiller such that the first, second and third chillers are arranged in series, the outlet of the third chiller is in fluid communication with the water inlet of the air cooler, and the inlet of the first chiller is in fluid communication with the water outlet of the air cooler.*

*51. The system of claim 50, the water circulation system further comprising water disposed therein, wherein the water has a first temperature at the inlet of the first chiller and a second temperature, cooler than the first temperature, at the inlet to the second chiller and the water has a third temperature at the second chiller outlet that is cooler than the second temperature and the water has a fourth temperature at the third chiller outlet that is cooler than the third temperature.*

*52. The system of claim 50, further comprising a thermal energy storage tank having a warm water port and a cool water port and a water reservoir defined within the tank, the reservoir having an upper first portion and a lower second portion, wherein the warm water port is in fluid communication with the first portion of the reservoir, the cool water port is in fluid communication with the second portion of reservoir, the warm water port is in fluid communication with the third chiller inlet and the cool water port is in fluid communication with the third chiler outlet.*

*53. A system for chilling inlet air to a gas turbine plant, comprising:*

*a. a gas turbine that includes a gas turbine air inlet;*

*b. an air cooler disposed adjacent the gas turbine air inlet, the air cooler having an air inlet, an air outlet, a liquid water inlet and a liquid water outlet;*

*c. a thermal energy storage tank having a warm water port and a cool water port and a water reservoir defined within the tank, the reservoir having an upper first portion and a lower second portion, wherein the warm water port is in fluid communication with the first portion of the reservoir and the cool water port is in fluid communication with the second portion of reservoir;*

*d. a water circulation system, the water circulation system comprising a first chiller, the first chiller having a first chiller inlet and outlet, wherein the outlet of the first chiller is in fluid communication with the cool water port, and the inlet of the first chiller is in fluid communication with the warm water port of the thermal energy storage tank;*

*e. a sensor system having at least one sensor adjacent the air outlet of the air cooler; and*

*f. a control system disposed to alter a characteristic of the water in the water circulation system based on the sensor system and a first predetermined set point,*

*g. a pump system having a pump inlet, wherein the pump inlet is in fluid communication with the second portion of the reservoir and the liquid water outlet of the air cooler is in fluid communication with the first portion of the reservoir.*

*54. The system of claim 53, wherein the sensor comprises a temperature sensor.*

*55. The system of claim 53, wherein the sensor comprises a relative humidity sensor.*

*56. The system of claim 53, wherein the sensor system comprises a relative humidity sensor and a temperature sensor.*

*57. A system for chilling inlet air to a gas turbine plant, comprising:*

*a. a gas turbine that includes a gas turbine air inlet;*

*b. an air cooler disposed adjacent the gas turbine air inlet, the air cooler having an air inlet, an air outlet, a liquid water inlet and a liquid water outlet;*

*d. a water circulation system comprising water disposed therein, a first chiller having a first chiller inlet and outlet and a second chiller having a second chiller inlet and outlet, wherein the outlet of the first chiller is in fluid communication with the inlet of the second chiller such that the first and second chillers are arranged in series, the outlet of the second chiller is in fluid communication with the air cooler, wherein the water has a first temperature at the inlet of the first chiller and a second temperature, cooler than the first temperature, at the inlet to the second chiller and the water has a third temperature at the second chiller outlet that is cooler than the second temperature; and*

*e. an additive disposed in the water within the water circulation system, wherein the additive is capable of reducing the freezing point of water.*

*58. A system for chilling inlet air to a gas turbine plant, comprising:*

*a. a gas turbine that includes a gas turbine air inlet;*

*b. an air cooler disposed adjacent the gas turbine air inlet, the air cooler having an air inlet, an air outlet, a liquid water inlet and a liquid water outlet;*

*c. a chilled water circulation system comprising a first water chiller and a second water chiller, each of the*

*chillers having an evaporator with an inlet and outlet, wherein the outlet of the first water chiller evaporator is in fluid communication with the water inlet of the second water chiller evaporator, the outlet of the second water chiller evaporator is in fluid communication with the liquid water inlet of the air cooler, and the inlet of the first water chiller evaporator is in fluid communication with the water outlet of the air cooler; and*

*d. a condenser water circuit, wherein each of the first and second water chillers has a condenser water inlet and outlet, wherein the condenser water inlet of the first water chiller is in fluid communication with the condenser water outlet of the second water chiller, whereby water flow through the condenser water circuit is in a direction opposite of chilled water flow through the chilled water circulation system.*

*59. The system of claim 58, wherein the condenser water inlet and outlet of the first water chiller are comprised of a first condenser and the condenser water inlet and outlet of the second water chiller are comprised of a second condenser.*

*60. The system of claim 58, wherein the first and second water chillers comprise a duplex chiller.*

*61. The system of claim 59, wherein the first and second water chillers comprise a duplex chiller.*

*62. The system of claim 59, further comprising a cooling tower having a water inlet and water outlet, wherein the water inlet of the cooling tower is in fluid communication with a water outlet of the condenser of the first chiller and the water outlet of the cooling tower is in fluid communication with a water inlet of the condenser of the second chiller.*

*63. The system of claim 58, further comprising a thermal energy storage tank having a warm water port and a cool water port and a water reservoir defined within the tank, the reservoir having an upper first portion and a lower second portion, wherein the warm water port is in fluid communication with the first portion of the reservoir and the cool water port is in fluid communication with the second portion of reservoir, wherein the outlet of the second chiller is in fluid communication with the cool water port, and the inlet of the first chiller is in fluid communication with the warm water port of the thermal energy storage tank.*

*64. The system of claim 63, wherein the cool water port is disposed between the outlet of the evaporator of the second chiller and the liquid water inlet of the air cooler and the warm water port is disposed between the inlet of the first chiller evaporator and the water outlet of the air cooler.*

*65. A method for chilling inlet air to a gas turbine, comprising:*

*providing a chilled water circuit having a first water chiller and a second water chiller, the first and second water chillers being arranged in series for circulating chilled water in a first flow direction through the chilled water circuit;*

*providing a circulating condenser water circuit that circulates cooling water through the second water chiller and then through the first water chiller such that the condenser water circuit is counterflow to the chilled water circuit;*

*providing an inlet air chiller for lowering the temperature of air being fed to a gas turbine compressor through heat transfer between the circulating water and the air;*

*passing chilled water through the first water chiller, wherein the chilled water passing through the first water chiller is lowered from a first temperature to a second temperature that is lower than the first temperature;*

*passing the chilled water from the first water chiller through the second water chiller, wherein the chilled water temperature is lowered to a third temperature that is lower than the second temperature, thus providing a staged temperature drop of the chilled water; and*

*passing at least a portion of the chilled water from the chilled water circuit through the inlet air chiller resulting in heat transfer between the chilled water and the air, such that the temperature of the air is lowered.*

*66. The system of claim 24, wherein the variable flow pump system comprises a flow control valve.*

*67. The system of claim 39, wherein the variable flow pump system comprises a flow control valve.*

*68. The system of claim 59, wherein the first and second water chillers comprise a duplex chiller, whereby the first condenser is joined directly to the second condenser such that both the first and second condensers share the same condenser tubes.*

*69. The system of claim 58, wherein the first and second water chillers comprise a duplex chiller whereby the first evaporator is joined directly to the second evaporator such that both the first and second evaporators share the same evaporator tubes.*

*70. The method of claim 65 wherein the wherein the first and second chillers together comprise a single duplex chiller.*

*71. A system for chilling inlet air to a gas turbine plant, comprising*

*a. a gas turbine that includes a gas turbine air inlet;*

*b. an air cooler disposed adjacent the gas turbine air inlet, the air cooler having an air inlet, an air outlet, a liquid water inlet and a liquid water outlet;*

*c. a thermal energy storage tank having a warm water port and a cool water port, and*

*d. a first water circulation system comprising a duplex chiller with a duplex chiller outlet in fluid communication with the cool water port of the thermal energy storage tank, and a duplex chiller inlet in fluid communication with the warm water port of the thermal energy storage tank;*

*e. wherein the liquid water inlet of the air cooler is in fluid communication with the cool water port of the thermal energy storage tank and the liquid water outlet of the air cooler is in fluid communication with the warm water port of the thermal energy storage tank.*

*72. The system of claim 71 wherein the duplex chiller comprises a centrifugal water chiller.*

*73. The system of claim 72 wherein the centrifugal water chiller is a Trane duplex centrifugal CDHF water chiller.*

*74. The system of claim 71, wherein the duplex chiller has a first condenser that is joined directly to a second condenser such that both the first and second condensers share the same condenser tubes.*

*75. The system of claim 71, wherein the duplex chiller has a first evaporator that is joined directly to a second evaporator such that both the first and second evaporators share the same evaporator tubes.*

*76. A system for chilling inlet air to a gas turbine plant, comprising:*

*a. a gas turbine that includes a gas turbine air inlet;*

*b. an air cooler disposed adjacent the gas turbine air inlet, the air cooler having an air inlet, an air outlet, a liquid water inlet and a liquid water outlet;*

*c. a thermal energy storage tank having a warm water port and a cool water port and a water reservoir defined within the tank, the reservoir having an upper first portion and a lower second portion, wherein the warm water port is in fluid communication with the first por-*

*tion of the reservoir and the cool water port is in fluid communication with the second portion of reservoir; and*

*d. a first water circulation system comprising a first chiller having a first chiller inlet and outlet and a second chiller having a second chiller inlet and outlet, wherein the outlet of the first chiller is in fluid communication the inlet of the second chiller such that the first and second chillers are arranged in series, the outlet of the second chiller is in fluid communication with the cool water port, and the inlet of the first chiller is in fluid communication with the warm water port of the thermal energy storage tank,*

*e. wherein the liquid water inlet of the air cooler is in fluid communication with the cool water port and the liquid water outlet of the air cooler is in fluid communication with the warm water port.*

*77. The system of claim 76 whereby the first and second chillers are comprised of a single duplex chiller having two compressors and two refrigerant circuits.*

*78. The system of claim 77 whereby the duplex chiller comprises two evaporators arranged in series with circulating evaporator water at a first stage having a first temperature, circulating evaporator water at a second stage having a second temperature lower than the circulating evaporator water first temperature and circulating evaporator water at a third stage having a third temperature lower than the circulating evaporator water second temperature.*

*79. The system of claim 77 whereby the duplex chiller comprises two condensers arranged in series with circulating condenser water having a first temperature at a first stage, circulating condenser water at a second stage having a second temperature higher than the circulating condenser water first temperature and circulating condenser water at a third stage having a third temperature higher than the circulating condenser water second temperature.*

*80. The system of claim 77 whereby the duplex chiller comprises a counterflow, wherein evaporator water flow is in a direction opposite to condenser water flow.*

*81. The system of claim 77 wherein the duplex chiller comprises a centrifugal water chiller.*

*82. The system of claim 81 wherein the centrifugal water chiller is a Trane duplex centrifugal CDHF water chiller.*

* * * * *